(12) United States Patent
Vester et al.

(10) Patent No.: US 11,818,161 B2
(45) Date of Patent: Nov. 14, 2023

(54) NETWORK SECURITY THROUGH LINKING VULNERABILITY MANAGEMENT AND CHANGE MANAGEMENT

(71) Applicant: ServiceNow, Inc., Santa Clara, CA (US)

(72) Inventors: Anna Anatolyevna Vester, San Diego, CA (US); Lisa Sherilyn Henderson, Temecula, CA (US); Antonio Challita, Carlsbad, CA (US); Betsy Cherian, Poway, CA (US); John Anthony Rissone, San Diego, CA (US); Hnin Haymar, San Diego, CA (US); James Gavin Erbes, San Jose, CA (US)

(73) Assignee: ServiceNow, Inc., Santa Clara, CA (US)

( * ) Notice: Subject to any disclaimer, the term of this patent is extended or adjusted under 35 U.S.C. 154(b) by 0 days.

(21) Appl. No.: 17/452,147

(22) Filed: Oct. 25, 2021

(65) Prior Publication Data
US 2022/0046049 A1  Feb. 10, 2022

Related U.S. Application Data

(63) Continuation of application No. 16/682,878, filed on Nov. 13, 2019, now Pat. No. 11,159,557.

(51) Int. Cl.
*H04L 9/40* (2022.01)
*G06F 8/65* (2018.01)
*H04L 41/22* (2022.01)

(52) U.S. Cl.
CPC ............ *H04L 63/1433* (2013.01); *G06F 8/65* (2013.01); *H04L 41/22* (2013.01); *H04L 63/20* (2013.01)

(58) Field of Classification Search
CPC ..... H04L 63/1433; H04L 63/20; H04L 41/22; G06F 8/65; G06F 9/451; G06F 21/577
See application file for complete search history.

(56) References Cited

U.S. PATENT DOCUMENTS

| | | |
|---|---|---|
| 5,978,594 A | 11/1999 | Bonnell |
| 6,321,229 B1 | 11/2001 | Goldman |

(Continued)

OTHER PUBLICATIONS

Cadariu, Mircea, et al. "Tracking known security vulnerabilities in proprietary software systems." 2015 IEEE 22nd International Conference on Software Analysis, Evolution, and Reengineering (SANER). IEEE. (Year: 2015).*

(Continued)

*Primary Examiner* — John M MacIlwinen
(74) *Attorney, Agent, or Firm* — FLETCHER YODER PC

(57) ABSTRACT

A computational instance may contain a plurality of vulnerable items and a plurality of change requests, wherein at least some of the vulnerable items are assigned to a vulnerability group, the vulnerable items represent hardware or software components that exhibit known vulnerabilities, and the change requests represent additions, removals, or modifications of the hardware or software components. The computational instance may further include one or more computing devices configured to: generate a representation of a first graphical user interface containing data related to the vulnerability group, generate a representation of a second graphical user interface that allows specification of change request options, generate a representation of a third graphical user interface with data entry fields for a corresponding change request that are auto-populated based on the data related to the vulnerability group, and add a corresponding change request to the plurality of change requests.

16 Claims, 24 Drawing Sheets

(56) References Cited

U.S. PATENT DOCUMENTS

| | | |
|---|---|---|
| 6,799,189 B2 | 9/2004 | Huxoll |
| 6,816,898 B1 | 11/2004 | Scarpelli |
| 6,895,586 B1 | 5/2005 | Brasher |
| 7,027,411 B1 | 4/2006 | Pulsipher |
| 7,392,300 B2 | 6/2008 | Anantharangachar |
| 7,617,073 B2 | 11/2009 | Trinon |
| 7,685,167 B2 | 3/2010 | Mueller |
| 7,877,783 B1 | 1/2011 | Cline |
| 7,933,927 B2 | 4/2011 | Dee |
| 7,941,506 B2 | 5/2011 | Bonal |
| 7,945,860 B2 | 5/2011 | Vambenepe |
| 8,082,222 B2 | 12/2011 | Rangarajan |
| 8,140,664 B2 * | 3/2012 | Huang .................... G06F 21/55 709/224 |
| 8,201,257 B1 | 6/2012 | Andres |
| 8,346,752 B2 | 1/2013 | Sirota |
| 8,380,645 B2 | 2/2013 | Kowalski |
| 8,554,750 B2 | 10/2013 | Rangaranjan |
| 8,572,679 B1 * | 10/2013 | Wang ................. H04L 41/0813 370/328 |
| 8,646,093 B2 | 2/2014 | Myers |
| 8,683,032 B2 | 3/2014 | Spinelli |
| 8,745,040 B2 | 6/2014 | Kowalski |
| 8,812,539 B2 | 8/2014 | Milousheff |
| 8,818,994 B2 | 8/2014 | Kowalski |
| 8,832,652 B2 | 9/2014 | Mueller |
| 8,908,988 B2 | 12/2014 | Poston |
| 8,984,643 B1 * | 3/2015 | Krisher ............... H04L 63/1408 726/25 |
| 9,015,188 B2 | 4/2015 | Behne |
| 9,037,536 B2 | 5/2015 | Vos |
| 91,371,115 | 9/2015 | Mayfield |
| 9,261,372 B2 | 2/2016 | Cline |
| 9,323,801 B2 | 4/2016 | Morozov |
| 9,363,252 B2 | 6/2016 | Mueller |
| 9,412,084 B2 | 9/2016 | Kowalski |
| 9,467,344 B2 | 10/2016 | Gere |
| 9,534,903 B2 | 1/2017 | Cline |
| 9,613,070 B2 | 4/2017 | Kumar |
| 9,631,934 B2 | 4/2017 | Cline |
| 9,645,833 B2 | 5/2017 | Mueller |
| 9,659,051 B2 | 5/2017 | Hutchins |
| 9,792,387 B2 | 10/2017 | George |
| 9,852,165 B2 | 12/2017 | Morozov |
| 9,911,087 B1 | 3/2018 | Henderson et al. |
| 9,967,162 B2 | 5/2018 | Spinelli |
| 10,002,203 B2 | 6/2018 | George |
| 10,015,186 B1 | 7/2018 | Tamir et al. |
| 10,277,629 B1 * | 4/2019 | Guntur .................. G06F 16/285 |
| 10,430,179 B1 | 10/2019 | Kumar |
| 11,159,557 B2 * | 10/2021 | Vester ....................... G06F 8/65 |
| 2006/0101517 A1 * | 5/2006 | Banzhof ............. H04L 63/1433 726/25 |
| 2013/0191919 A1 * | 7/2013 | Basavapatna ........... H04L 63/20 726/25 |
| 2013/0247206 A1 * | 9/2013 | Hugard, IV ............ G06F 21/57 726/25 |
| 2014/0331326 A1 * | 11/2014 | Thakur ............... H04L 63/1433 726/25 |
| 2016/0373478 A1 * | 12/2016 | Doubleday ............... G06F 8/65 |
| 2018/0107954 A1 | 4/2018 | Henderson et al. |
| 2018/0157842 A1 * | 6/2018 | Holz ..................... G06F 16/338 |
| 2019/0102560 A1 * | 4/2019 | Zettel, II ............. G06F 11/3051 |
| 2019/0306236 A1 * | 10/2019 | Wiener ............... H04L 41/0897 |
| 2020/0228560 A1 | 7/2020 | Murthy |

OTHER PUBLICATIONS

ServiceNow, New York IT Service Management, Oct. 17, 2019, downloaded from http://docs.servicenow.com.

ServiceNow, New York Security Incident Management, Oct. 21, 2019, downloaded from http://docs.servicenow.com.

ServiceNow Whitepaper; Security Operations Use Case Guide; https://www.servicenow.com/content/dam/servicenow-assets/public/en-us/doc-type-resource-center/white-paper/security-operations-use-case-guide.pdf pp. 12 (Year:2018).

Patel et al., ServiceNow: CMDB Research; Clark University. pp. 1-124 (Year 2019).

* cited by examiner

Create change request
For Vulnerability Group VUL0004580                    [Create Change]  [Cancel]

950 → (top-left marker)
960 → Create Change button

Applies to: All active vulnerable items in this group ▼
Add CIs to CR: ☑
Change type: Emergency ▼

Change Request Preview  ← 952

| | | | |
|---|---|---|---|
| Priority | 1 - Critical ▼ | Assignment group | OS Support Group 🔍 ⓘ |
| Planned end date | 2019-10-10 00:00:00 | Assigned to | John Doe 🔍 ⓘ |

← 954

Short description: !!! Critical !!! Vulnerabilities with known exploits: CVE-2014-6271

Description: A vulnerability group VUL0004580 with security vulnerabilities in your environment requires remediation. Please refer to the Planning tab in this change request for more information.

956 →

Justification: This change is required to address 9 vulnerabilities across 10 CIs with a risk rating up to '1 - Critical'. The remediation target date is 2019-10-10.

Implementation plan:
Solution: VS0003597
Source: Microdyne
Requires restart: MAYBE
Summary: July 9, 2019 – KB4506991 Cumulative Update for .NET Framework 3.5 and 4.8 for OS 10, version 1903
Bulletin: July 2019 Security Updates
Description: See Links for additional information.
Links:
https://support.microdyne.com/help/4506991
https://catalog.update.microdyne.com/v7/site/Search.aspx?q=KB4506991

958 →
960 →

[Create Change]  [Cancel]

| Change Request CHG0030026 | ⌄╪⋯ Follow ▾ | Request Approval | Update | Delete | ↑ |

| Number | CHG0030026 | ← 972 | Type | Emergency ▾ |
|---|---|---|---|---|
| Requested by | System Administrator 🔍 | | State | Open ▾ |
| Category | Other ▾ | | Conflict Status | Not Run |
| Service | 🔍 | | Conflict Last Run | |
| Configuration item | 🔍 | | Assignment group | OS Support Group 🔍 |
| Priority | 1 - Critical ▾ | | Assigned to | John Doe 🔍 |
| Risk | Moderate ▾ | | | |
| Impact | 3 - Low ▾ | | | |

Short description: !!! Critical !!! Vulnerabilites with known exploits: CVE-2014-6271

Description: A vulnerability group VUL0004580 with security vulnerabilities in your environment requires remediation. Please refer to the Planning tab in this change request for more information

| Planning | Schedule | Conflicts | Notes | Closure information |

Justification: This change is required to address 8 vulnerabilities across 9 CIs with a risk rating up to '1 – Critical'. The remediation target date is 2019-10-10.

Implementation plan:
Solution: VS0003597
Source: Microdyne
Requires restart: MAYBE
Summary: July 9, 2019 – KB4506991 Cumulative Update for .NET Framework 3.5 and 4.8 for OS 10, version 1903
Bulletin: July 2019 Security Updates
Description: See Links for additional information.
Links:
https://support.microdyne.com/help/4506991
https://catalog.update.microdyne.com/v7/site/Search.aspx?q=KB4506991

```
Create change request                    [Create Change] [Cancel] ↑
For Vulnerability Group VUL0004580
```

| | |
|---|---|
| Applies to | All active vulnerable items in this group ▼ |
| Add CIs to CR | ✓ |
| 982 → Change type | Standard ▼ |
| 984 → Change category | Patching Standard Changes ▼ |
| Change template | Microdyne Monthly Patching Cycle ▼ |

Change Request Preview

| | | | |
|---|---|---|---|
| Priority | 1 - Critical ▼ | Assignment group | OS Support Group 🔍 ⓘ |
| Planned end date | 2019-10-10 00:00:00 | Assigned to | John Doe 🔍 ⓘ |
| Short description | !!! Critical !!! Vulnerabilities with known exploits: CVE-2014-6271 | | |
| Justification | This change is required to address 9 vulnerabilities across 10 CIs with a risk rating up to '1 - Critical'. The remediation target date is 2019-10-10. | | |

[Create Change] [Cancel]

Vulnerability Group 1100
VUL0004437

| | | | | | |
|---|---|---|---|---|---|
| ∨ | Follow ▾ | Update | Start Investigation | Next | Split Group 1102 | Close/Defer | Delete |

Number: VUL0004437

Risk rating: 2 - High

Risk score: 75

Remediation target: 2019-09-19 01:00:00

Remediation status: Target Missed

State: Open ▾

Assignment group: OS Support Group 🔍

Assigned to: John Doe 🔍

Created: 2019-08-10 04:37:28

Updated: 2019-09-30 13:53:52

Short description: !!! Critical !!! Vulnerabilities on OS Servers with Known Exploits

| ☐ | Vulnerability Group VUL0010007 | ⌄ ✓ ❖ ⋯ | Follow ▽ | Update | Start Investigation | Next | Split Group | Close/Defer | Delete | ↑ |

1132 ─→ | Vulnerable items (5) | Task SLAs | Preferred Solutions (1) | Change Requests | □

| Vulnerable Items | New | Edit | Search | Vulnerable item | ▽ | Search | | 1 | to 5 of 5 | ▲ ▲▲ |

🔍 Vulnerability group = VUL0010007                                                       1134 ─→

| | ≡ Vulnerable item | ≡ Summary | ≡ Configuration item | ≡ Risk score | ≡ Risk rating | ≡ State | ≡ Remediation target | ≡ Remediation s |
|---|---|---|---|---|---|---|---|---|
| ☑ ⟩ | VIT0010006 | Microdyne Suite 2016... | WINSV-SD-6753 | 80 | 2 - High | Open | (empty) | No Target |
| ☑ ⟩ | VIT0010004 | Microdyne Suite 2016... | WINSV-SD-3535 | 80 | 2 - High | Open | (empty) | No Target |
| ☐ | VIT0010007 | Microdyne Suite 2016... | WINSV-SD-435 | 80 | 2 - High | Open | (empty) | No Target |
| ☐ | VIT0010005 | Microdyne Suite 2016... | WINSV-SD-6753 | 80 | 2 - High | Open | (empty) | No Target |
| ☐ | VIT0010003 | Microdyne Suite 2016... | WINSV-SD-3231 | 80 | 2 - High | Open | (empty) | No Target |

1136 ─→

| ☐ | Actions on selected rows... | ▽ ▽▽ | | 1 | to 5 of 5 | ▲ ▲▲ |
| | Split group | | | | | |
| | Delete | | | | | |
| | Create Application File | | | | | |
| | Assign Tag | | | | | |

FIG. 11D

NETWORK SECURITY THROUGH LINKING VULNERABILITY MANAGEMENT AND CHANGE MANAGEMENT

CROSS REFERENCE TO RELATED APPLICATIONS

This application is a continuation of U.S. patent application Ser. No. 16/682,878, entitled "IMPROVING NETWORK SECURITY THROUGH LINKING VULNERABILITY MANAGEMENT AND CHANGE MANAGEMENT," filed Nov. 13, 2019, which is hereby incorporated by reference in its entirety for all purposes.

BACKGROUND

Computer networks may include tens, hundreds, or thousands of individual computing devices, such as personal computers, laptop computers, servers, virtual machines, storage devices, routers, and so on. These components may be geographically distributed across multiple physical locations. As they may contain or provide access to confidential and/or sensitive information, the security of these devices can be important to individuals, groups, and organizations.

But with a large and diverse deployment of hardware, operating systems, and software applications, it can be challenging to manage the wide array of threats thereto from misconfigurations, hacking, espionage, etc. Thus, vulnerability assessment systems have been developed to automatically or semi-automatically calculate the presence and risk associated with known security vulnerabilities to which the computing devices on a network may be subject.

It is desirable to be able to address these vulnerabilities in an expeditious fashion, in order to mitigate their impact on the network, the data stored therein, and users. But the sheer number of computing devices that are disposed upon even a modestly-sized enterprise network and the vulnerabilities thereof can easily result in not all of these vulnerabilities being addressed in a timely manner.

SUMMARY

Vulnerable items in a managed network may include software and/or hardware components that are subject to known vulnerabilities. These vulnerable items may be arranged into vulnerability groups, with one or more vulnerable items per vulnerability group. The vulnerable items in such a vulnerability group may exhibit more than one vulnerability.

Vulnerable items are addressed by information technology (IT) personnel in various ways. These may involve applying a software patch, removing a software package, running a virus scan, applying a mitigating control, and changing a configuration, among other possibilities. In order to track what changes are to be made to vulnerable items, a change request task management system may be used. Each change request specifies a distinct modification or set of modifications to be made to one or more vulnerable items, when the modification(s) should be made, who is responsible for the modification(s), and so on.

Vulnerable items and change requests are maintained in different databases or database tables, often with little or no coordination therebetween. Thus, as the number of vulnerable items scales, it can be difficult to determine which have been addressed by what change requests. Failure to properly address a vulnerable item can result in a security breach to a network, potentially causing losses in data, assets, and time taken to mitigate the impact of the breach. Therefore, it is desirable for there to be improved systems that better coordinate vulnerable items and change requests. Doing so can have an immediate and beneficial impact on the security and integrity of the network.

The embodiments herein provide for various ways in which vulnerable items and change requests can be cross-referenced to one another in an automated and user-friendly fashion. Through use of graphical user interfaces and underlying programmatic logic, change requests can be generated from vulnerability groups with data relevant to the modifications to be made auto-populated from the vulnerability groups. Further, vulnerability groups can be easily associated with existing change requests, to simplify applying regularly-released third-party patches, for example. Additional embodiments allow a vulnerability group to be split into two based on a filter expression or selected vulnerable items. Different change requests may be associated with each resulting vulnerability group. Furthermore, state transitions of change requests may automatically cause state changes for associated vulnerability groups and vice versa.

Accordingly, a first example embodiment may involve a computational instance. The computational instance may include persistent storage containing a plurality of vulnerable items and a plurality of change requests, wherein at least some of the vulnerable items are assigned to a vulnerability group, wherein the vulnerable items represent hardware or software components of a managed network that exhibit known vulnerabilities, wherein the change requests represent additions, removals, or modifications of the hardware or software components of the managed network, and wherein the managed network is associated with the computational instance. The computational instance may further include one or more computing devices configured to generate a representation of a first graphical user interface containing, for the vulnerability group: (i) an identifier, (ii) a criticality level, (iii) a target remediation time, (iv) a short description, and (v) a first graphical element for specifying a corresponding change request. The one or more computing devices may further be configured to provide, to a client device associated with the managed network, the representation of the first graphical user interface. The one or more computing devices may further be configured to, in response to receiving, from the client device, an indication that the first graphical element was actuated, generate a representation of a second graphical user interface that allows specification of change request options including: (i) whether the corresponding change request applies to some or all vulnerable items assigned to the vulnerability group, and (ii) an indication of an urgency of the corresponding change request. The one or more computing devices may further be configured to provide, to the client device, the representation of the second graphical user interface. The one or more computing devices may further be configured to, in response to receiving, from the client device, an indication that the change request options were specified, generate a representation of a third graphical user interface with data entry fields that are auto-populated with information based on: (i) the identifier, (ii) the criticality level, (iii) the target remediation time, and (iv) the short description, and wherein the third graphical user interface also contains a second graphical element for creating the corresponding change request. The one or more computing devices may further be configured to provide, to the client device, the representation of the third graphical user interface. The one or more computing devices may further be configured to, in response to receiving, from the client device, an indication that the second graphical element was actuated, add the corresponding change request to the plurality of change requests.

A second example embodiment may involve generating a representation of a first graphical user interface containing, for a vulnerability group: (i) an identifier, (ii) a criticality level, (iii) a target remediation time, (iv) a short description, and (v) a first graphical element for specifying a corresponding change request, wherein persistent storage contains a plurality of vulnerable items and a plurality of change requests, wherein at least some of the vulnerable items are assigned to the vulnerability group, wherein the vulnerable items represent hardware or software components of a managed network that exhibit known vulnerabilities, and wherein the change requests represent additions, removals, or modifications of the hardware or software components of the managed network. The second example embodiment may further involve providing, to a client device associated with the managed network, the representation of the first graphical user interface. The second example embodiment may further involve, in response to receiving, from the client device, an indication that the first graphical element was actuated, generating a representation of a second graphical user interface that allows specification of change request options including: (i) whether the corresponding change request applies to some or all vulnerable items assigned to the vulnerability group, and (ii) an indication of an urgency of the corresponding change request. The second example embodiment may further involve providing, to the client device, the representation of the second graphical user interface. The second example embodiment may further involve, in response to receiving, from the client device, an indication that the change request options were specified, generating a representation of a third graphical user interface with data entry fields that are auto-populated with information based on: (i) the identifier, (ii) the criticality level, (iii) the target remediation time, and (iv) the short description, and wherein the third graphical user interface also contains a second graphical element for creating the corresponding change request. The second example embodiment may further involve providing, to the client device, the representation of the third graphical user interface. The second example embodiment may further involve, in response to receiving, from the client device, an indication that the second graphical element was actuated, adding the corresponding change request to the plurality of change requests.

In a third example embodiment, an article of manufacture may include a non-transitory computer-readable medium, having stored thereon program instructions that, upon execution by a computing system, cause the computing system to perform operations in accordance with the first and/or second example embodiment.

In a fourth example embodiment, a computing system may include at least one processor, as well as memory and program instructions. The program instructions may be stored in the memory, and upon execution by the at least one processor, cause the computing system to perform operations in accordance with the first and/or second example embodiment.

In a fifth example embodiment, a system may include various means for carrying out each of the operations of the first and/or second example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 9D depicts another graphical user interface related to creating a change request from a vulnerability group, in accordance with example embodiments.

FIG. 9E depicts another graphical user interface related to creating a change request from a vulnerability group, in accordance with example embodiments.

FIG. 9F depicts another graphical user interface related to creating a change request from a vulnerability group, in accordance with example embodiments.

FIG. 10A depicts a graphical user interface related to linking a vulnerability group to an existing change request, in accordance with example embodiments.

FIG. 10C depicts another graphical user interface related to linking a vulnerability group to an existing change request, in accordance with example embodiments.

FIG. 11A depicts a graphical user interface related to splitting a vulnerability group, in accordance with example embodiments.

FIG. 11C depicts another graphical user interface related to splitting a vulnerability group, in accordance with example embodiments.

FIG. 11D depicts another graphical user interface related to splitting a vulnerability group, in accordance with example embodiments.

DETAILED DESCRIPTION

Figure 1:
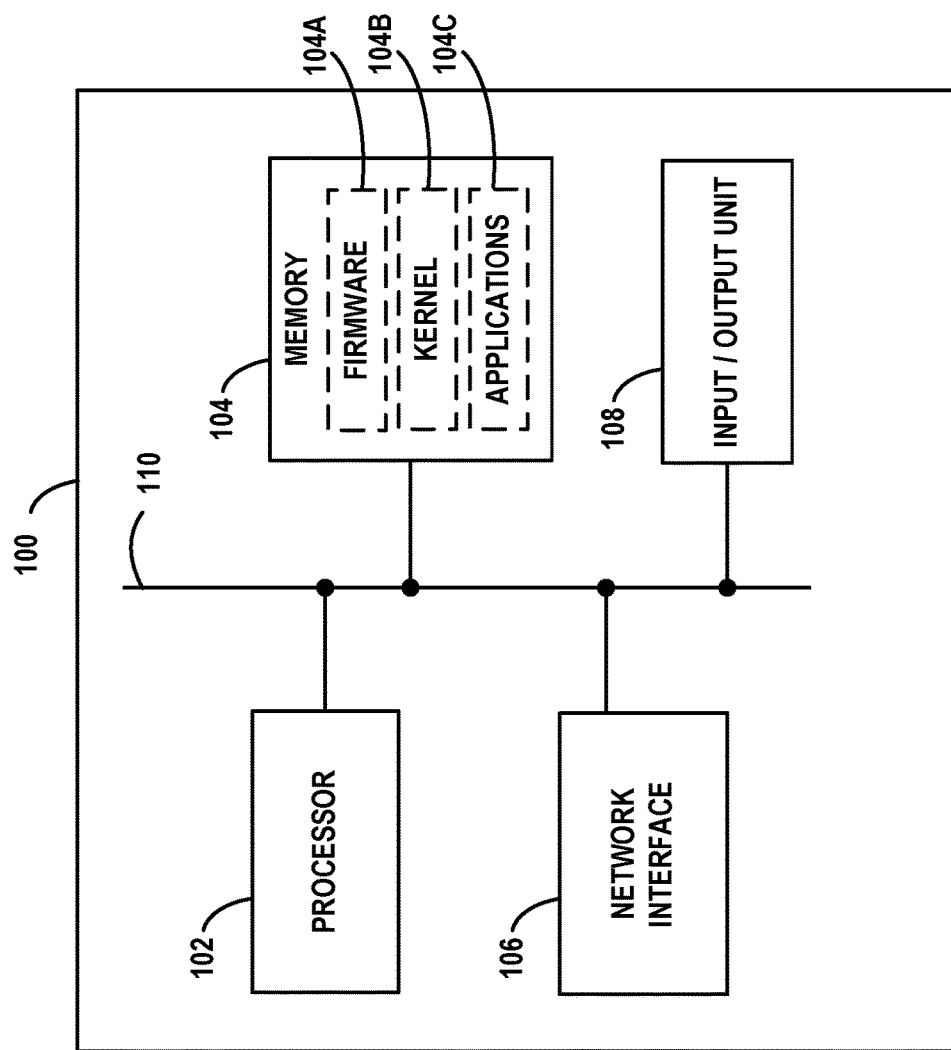
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. INTRODUCTION

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline, and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflows for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

Such an aPaaS system may represent a GUI in various ways. For example, a server device of the aPaaS system may generate a representation of a GUI using a combination of HTML, and JAVASCRIPT®. The JAVASCRIPT® may include client-side executable code, server-side executable code, or both. The server device may transmit or otherwise provide this representation to a client device for the client device to display on a screen according to its locally-defined look and feel. Alternatively, a representation of a GUI may take other forms, such as an intermediate form (e.g., JAVA® byte-code) that a client device can use to directly generate graphical output therefrom. Other possibilities exist.

Further, user interaction with GUI elements, such as buttons, menus, tabs, sliders, checkboxes, toggles, etc. may be referred to as "selection", "activation", or "actuation" thereof. These terms may be used regardless of whether the GUI elements are interacted with by way of keyboard, pointing device, touchscreen, or another mechanism.

An aPaaS architecture is particularly powerful when integrated with an enterprise's network and used to manage such a network. The following embodiments describe architectural and functional aspects of example aPaaS systems, as well as the features and advantages thereof.

II. EXAMPLE COMPUTING DEVICES AND CLOUD-BASED COMPUTING ENVIRONMENTS

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and input/output unit 108, all of which may be coupled by system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and buses) of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
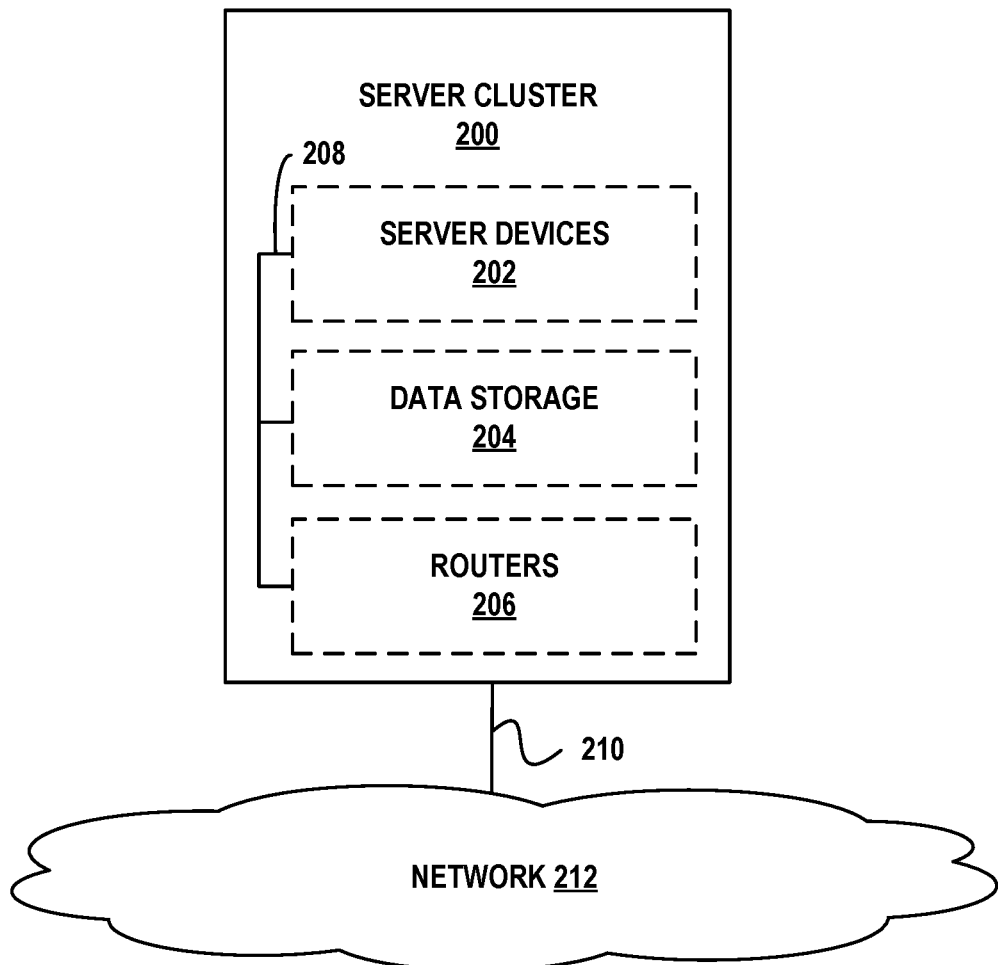
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purposes of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency, and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page or web application representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages. Alternatively or additionally, JAVA® may be used to facilitate generation of web pages and/or to provide web application functionality.

III. EXAMPLE REMOTE NETWORK MANAGEMENT ARCHITECTURE

Figure 3:
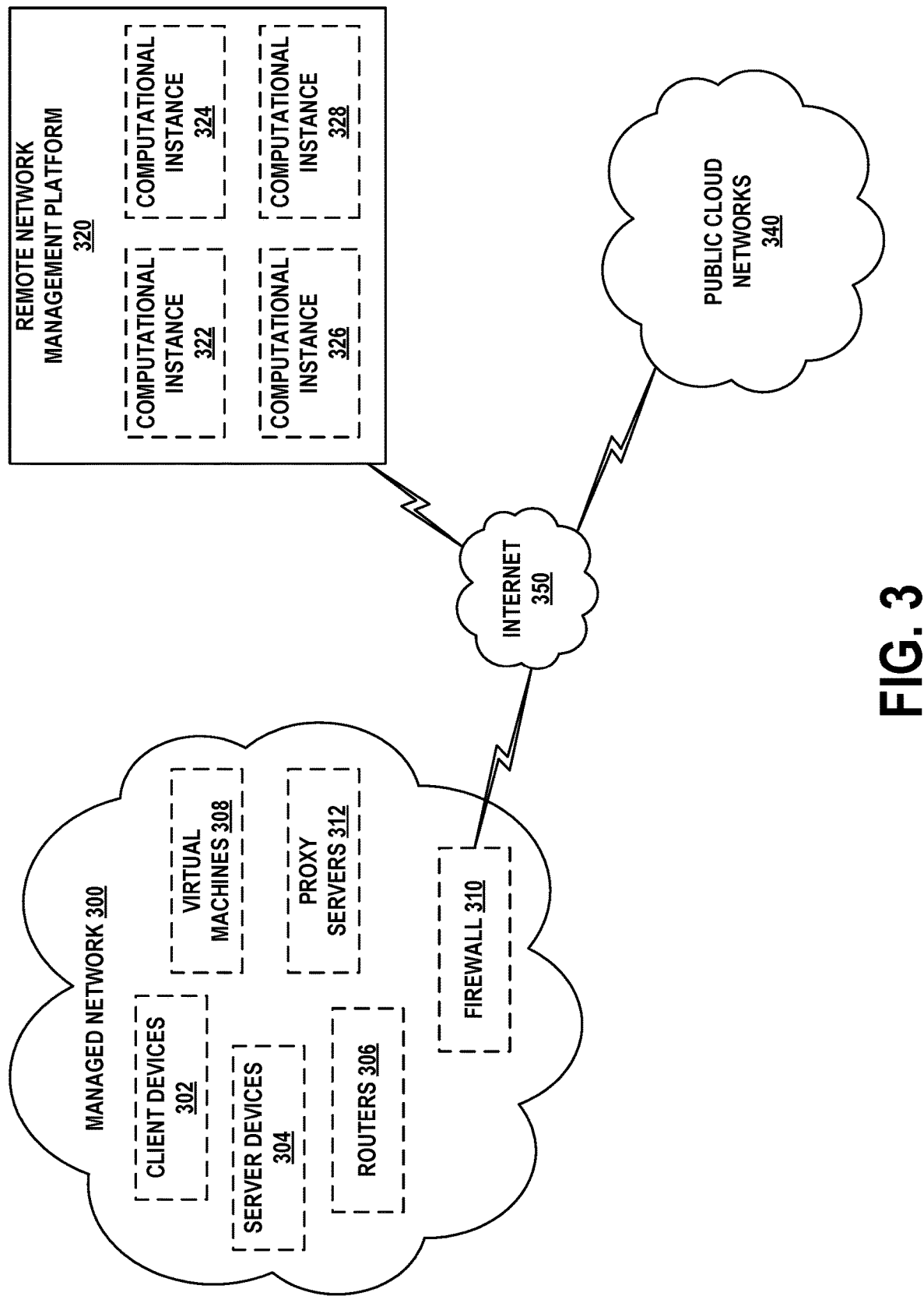
FIG. 3 depicts a remote network management architecture, in accordance with example embodiments.

FIG. 3 depicts a remote network management architecture, in accordance with example embodiments. This architecture includes three main components—managed network 300, remote network management platform 320, and public cloud networks 340—all connected by way of Internet 350.

A. Managed Networks

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server application that facilitates communication and movement of data between managed network 300, remote network management platform 320, and public cloud networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of public cloud networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

B. Remote Network Management Platforms

Remote network management platform 320 is a hosted environment that provides aPaaS services to users, particularly to the operator of managed network 300. These services may take the form of web-based portals, for example, using the aforementioned web-based technologies. Thus, a user can securely access remote network management platform 320 from, for example, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these computational instances may represent one or more server nodes operating dedicated copies of the aPaaS software and/or one or more database nodes. The arrangement of server and database nodes on physical server devices and/or virtual machines can be flexible and may vary based on enterprise needs. In combination, these nodes may provide a set of web portals, services, and applications (e.g., a wholly-functioning aPaaS system) available to a particular enterprise. In some cases, a single enterprise may use multiple computational instances.

For example, managed network 300 may be an enterprise customer of remote network management platform 320, and may use computational instances 322, 324, and 326. The reason for providing multiple computational instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows within one or more database tables).

For purposes of clarity, the disclosure herein refers to the arrangement of application nodes, database nodes, aPaaS software executing thereon, and underlying hardware as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of application and database nodes disposed upon some number of physical server devices or virtual machines. Such a central instance may serve as a repository for specific configurations of computational instances as well as data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate virtual machines that dedicate varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, a computational instance such as computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

C. Public Cloud Networks

Public cloud networks 340 may be remote server devices (e.g., a plurality of server clusters such as server cluster 200) that can be used for outsourced computation, data storage, communication, and service hosting operations. These servers may be virtualized (i.e., the servers may be virtual machines). Examples of public cloud networks 340 may include AMAZON WEB SERVICES® and MICROSOFT® AZURE®. Like remote network management platform 320, multiple server clusters supporting public cloud networks 340 may be deployed at geographically diverse locations for purposes of load balancing, redundancy, and/or high availability.

Managed network 300 may use one or more of public cloud networks 340 to deploy applications and services to its clients and customers. For instance, if managed network 300 provides online music streaming services, public cloud networks 340 may store the music files and provide web interface and streaming capabilities. In this way, the enterprise of managed network 300 does not have to build and maintain its own servers for these operations.

Remote network management platform 320 may include modules that integrate with public cloud networks 340 to expose virtual machines and managed services therein to managed network 300. The modules may allow users to request virtual resources, discover allocated resources, and provide flexible reporting for public cloud networks 340. In order to establish this functionality, a user from managed network 300 might first establish an account with public cloud networks 340, and request a set of associated resources. Then, the user may enter the account information into the appropriate modules of remote network management platform 320. These modules may then automatically discover the manageable resources in the account, and also provide reports related to usage, performance, and billing.

D. Communication Support and Other Operations

Internet 350 may represent a portion of the global Internet. However, Internet 350 may alternatively represent a different type of network, such as a private wide-area or local-area packet-switched network.

Figure 4:
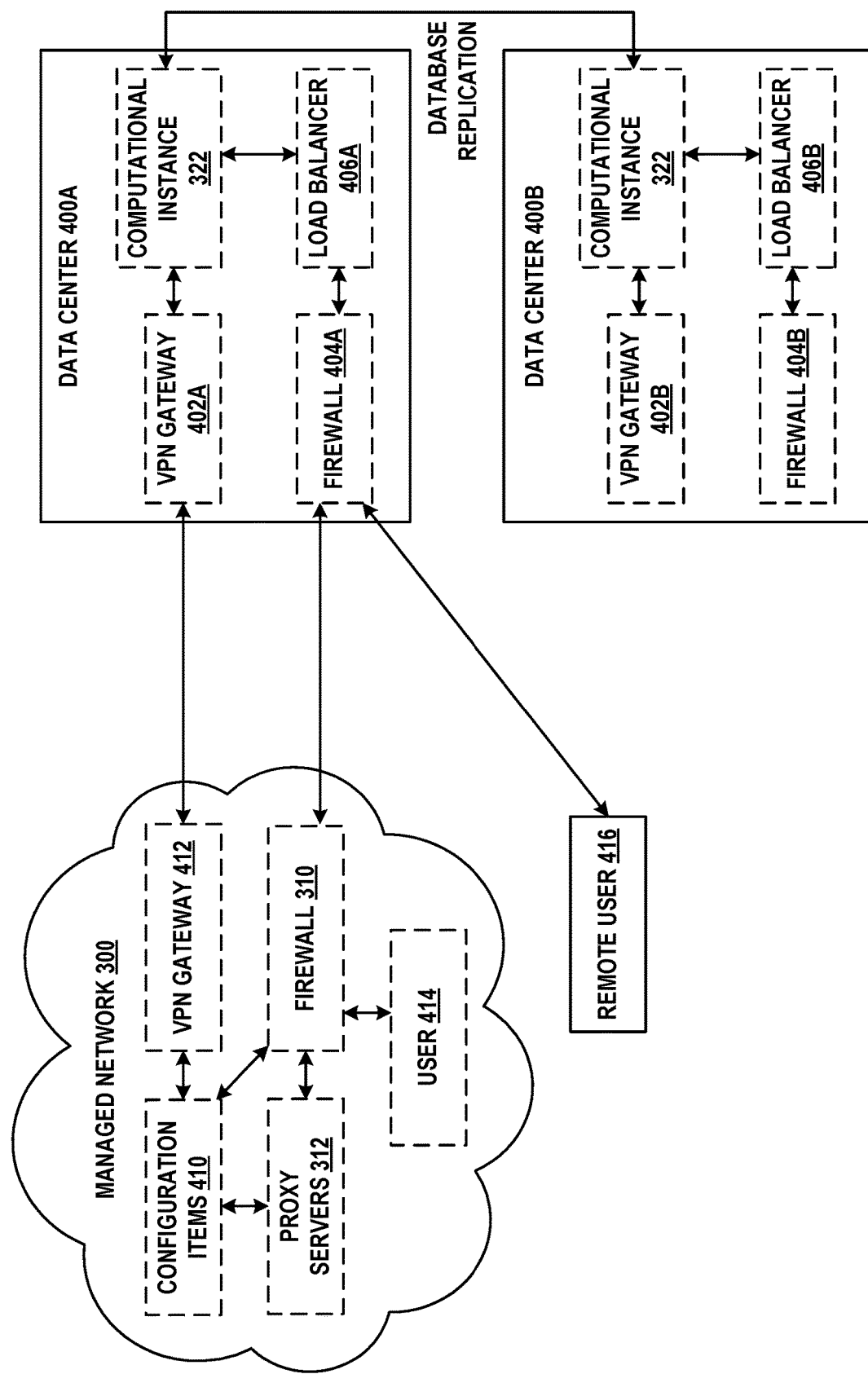
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. EXAMPLE DEVICE, APPLICATION, AND SERVICE DISCOVERY

In order for remote network management platform 320 to administer the devices, applications, and services of managed network 300, remote network management platform 320 may first determine what devices are present in managed network 300, the configurations and operational statuses of these devices, and the applications and services provided by the devices, as well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purposes of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
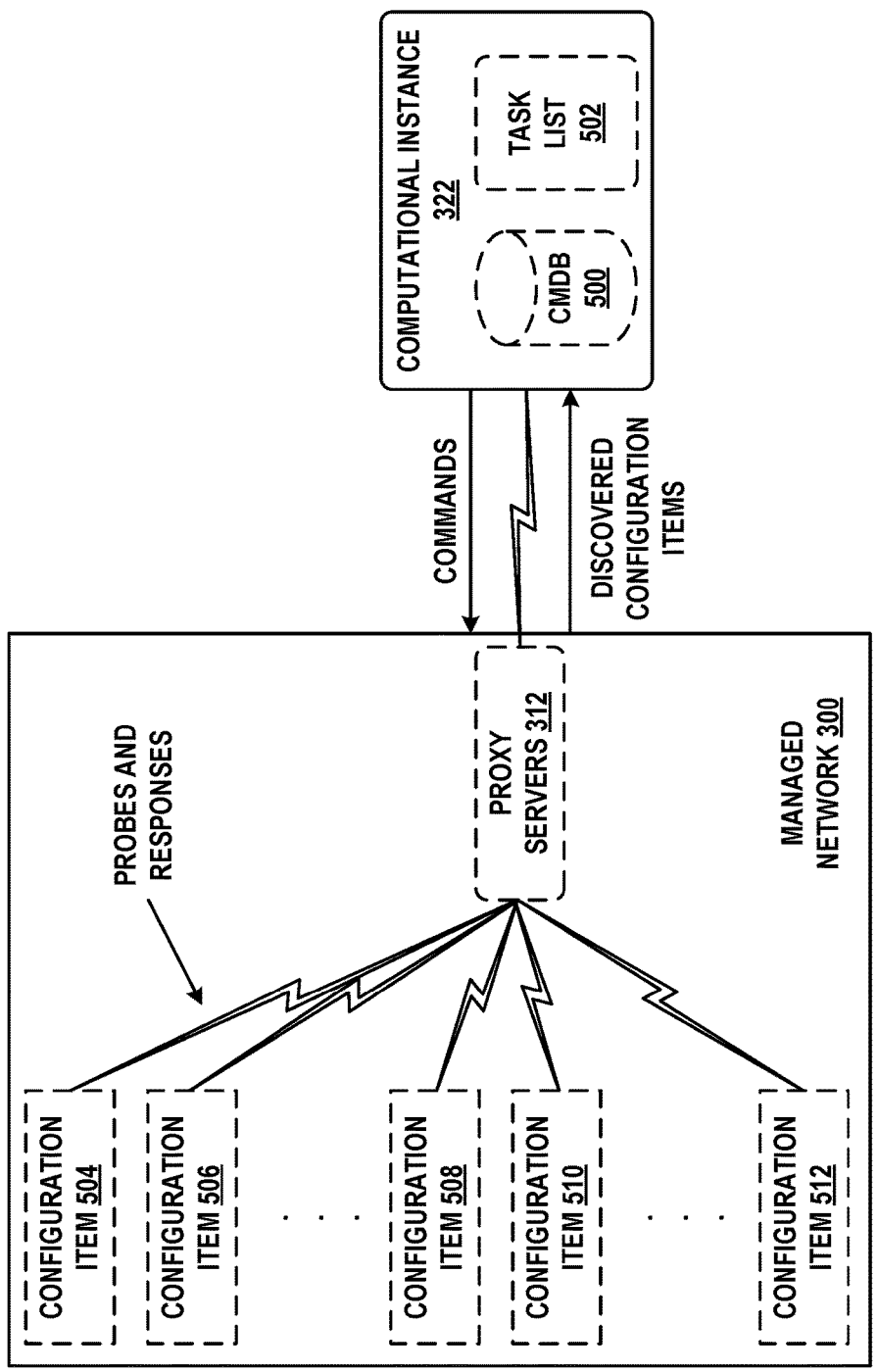
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, public cloud networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration, and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For example, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
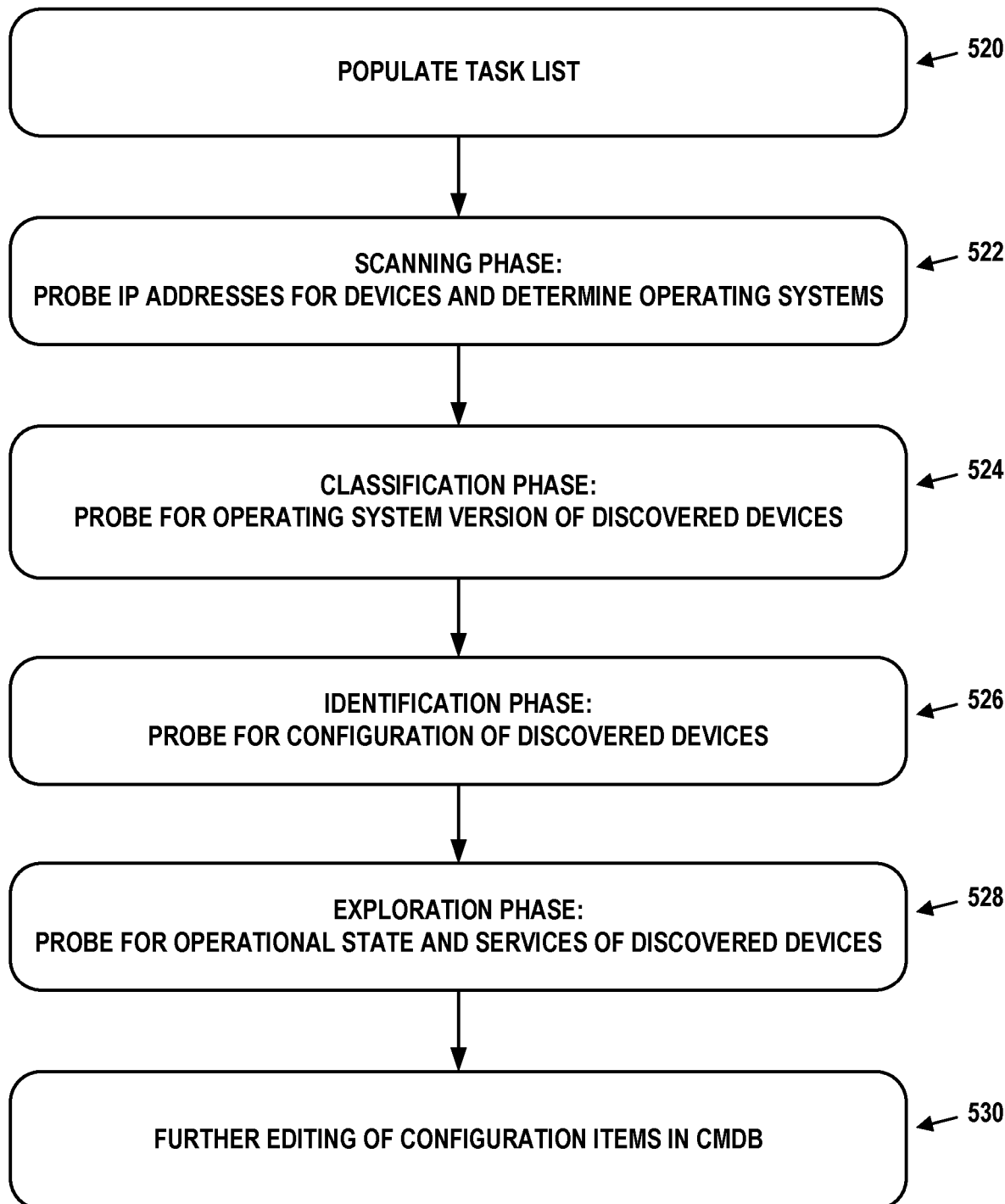
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are examples. Discovery may be a highly configurable procedure that can have more or fewer phases, and the operations of each phase may vary. In some cases, one or more phases may be customized, or may otherwise deviate from the exemplary descriptions above.

In this manner, a remote network management platform may discover and inventory the hardware, software, and services deployed on and provided by the managed network. As noted above, this data may be stored in a CMDB of the associated computational instance as configuration items. For example, individual hardware components (e.g., computing devices, virtual servers, databases, routers, etc.) may be represented as hardware configuration items, while the applications installed and/or executing thereon may be represented as software configuration items.

The relationship between a software configuration item installed or executing on a hardware configuration item may take various forms, such as "is hosted on", "runs on", or "depends on". Thus, a database application installed on a server device may have the relationship "is hosted on" with the server device to indicate that the database application is hosted on the server device. In some embodiments, the server device may have a reciprocal relationship of "used by" with the database application to indicate that the server device is used by the database application. These relationships may be automatically found using the discovery procedures described above, though it is possible to manually set relationships as well.

The relationship between a service and one or more software configuration items may also take various forms. As an example, a web service may include a web server software configuration item and a database application software configuration item, each installed on different hardware configuration items. The web service may have a "depends on" relationship with both of these software configuration items, while the software configuration items have a "used by" reciprocal relationship with the web service. Services might not be able to be fully determined by discovery procedures, and instead may rely on service mapping (e.g., probing configuration files and/or carrying out network traffic analysis to determine service level relationships between configuration items) and possibly some extent of manual configuration.

Regardless of how relationship information is obtained, it can be valuable for the operation of a managed network. Notably, IT personnel can quickly determine where certain software applications are deployed, and what configuration items make up a service. This allows for rapid pinpointing of root causes of service outages or degradation. For example, if two different services are suffering from slow response times, the CMDB can be queried (perhaps among other activities) to determine that the root cause is a database application that is used by both services having high processor utilization. Thus, IT personnel can address the database application rather than waste time considering the health and performance of other configuration items that make up the services.

V. EXAMPLE VULNERABILITIES

The vulnerabilities discussed herein may relate to known defects in hardware, operating systems, and/or software packages deployed throughout a managed network. Exploitation of a vulnerability may result in a negative impact to the data confidentiality, integrity, and/or availability of one or more computing devices. Such vulnerabilities may be associated with different severities.

For example, a first hypothetical vulnerability may be that opening a certain type of file in a word processing application provides a remotely-exploitable mechanism through which an attacker can gain access to the computing device on which the word processing application is installed. This would likely be viewed a critical vulnerability, as it could lead to unauthorized access to confidential data. On the other hand, a second hypothetical vulnerability may be that providing certain input to a web browsing application may cause the screen of the computing device on which the web browsing application is installed to go blank. This would likely be viewed as a non-critical vulnerability, as it is a mere annoyance to the user. Severity may be chosen, for example, on a spectrum from critical (most severe), to high, to medium, to low (least severe).

Listings of known vulnerabilities are published by governments, as well as various commercial entities. For example, the U.S. National Institute of Standards and Technology (NIST) maintains a public national vulnerability database, listing known vulnerabilities, their severities, and their exploitability (e.g., how an attacker might go about using the vulnerability and how hard this process might be). Exploitability scales may include indications of whether a known exploit exists, how skilled an attacker would have to be to use the exploit, and whether the attacker needs physical access to a target computing device to use the exploit and/or if the exploit can be used by way of a local or remote network.

Commercial listings may overlap with the government listings and with one another, but can include different vulnerability listings, and use different severity scales and/or exploitability scales. These discrepancies may be due to inherent subjectivity related to classifying vulnerability severity and exploitability, or that these commercial and governmental entities have had different experiences when testing the vulnerability.

It should be noted that vulnerabilities are not the same as active security threats. Vulnerabilities indicate that a problem has been identified independent of whether the vulnerability has been actually exploited. Active security threats, on the other hand, are ongoing exploitations that often require immediate attention. For example, a live distributed denial of service (DDOS) attack should be addressed in real time, regardless of whether any vulnerabilities that it uses are known.

Thus, security managers address vulnerabilities as time allows based on their severities and other factors. Critical severity vulnerabilities may be targeted for resolution within 3 days, for example, while high severity vulnerabilities may be targeted for resolution within 30 days, and so on. Vulnerabilities with lower-level severities may be addressed on an as-time-permits basis or might not be scheduled for resolution at all, as these non-critical vulnerabilities may be deemed low enough risk that security managers should be spending their time carrying out more important tasks instead.

Addressing a vulnerability may occur in various ways. In some cases, the vendor of an operating system or software package with an identified vulnerability may publish an installable patch that resolves the vulnerability. Alternatively, the vendor or another party may identify a workaround to the vulnerability, such as settings that mitigate or prevent the vulnerability from occurring. In some cases, security managers may disable software packages with unpatched vulnerabilities or issue warnings to users until a patch or workaround is available. In extreme situations, vulnerable software may be temporarily or permanently removed from impacted computing devices. Nonetheless, once a resolution is available, security managers may schedule the resolution to be applied in accordance with the severity of the vulnerability.

As the scope of computer networks and the extent of available software packages have grown dramatically, so has the number of vulnerabilities. For instance, the NIST database identified 1537 new vulnerabilities in April 2019 alone. This is in addition to other vulnerabilities that may have been identified in the past. As a result, there are over 117,000 known vulnerabilities in the NIST database. Identifying these vulnerabilities and their associated severities is not possible to do by hand even for a small managed network with just a few devices.

VI. Example Vulnerability Management Architecture

In order to be addressed, vulnerabilities are first detected on a managed network. Given the intractability of doing so manually, a number of software tools are available that perform automated vulnerability detection. Some of these tools include, but are not limited to, NESSUS®, QUALYS-GUARD®, and RAPID7®. For purposes of simplicity, various vulnerability detection and assessment tools are referred to as third-party vulnerability tools in the discussion below.

Figure 6:
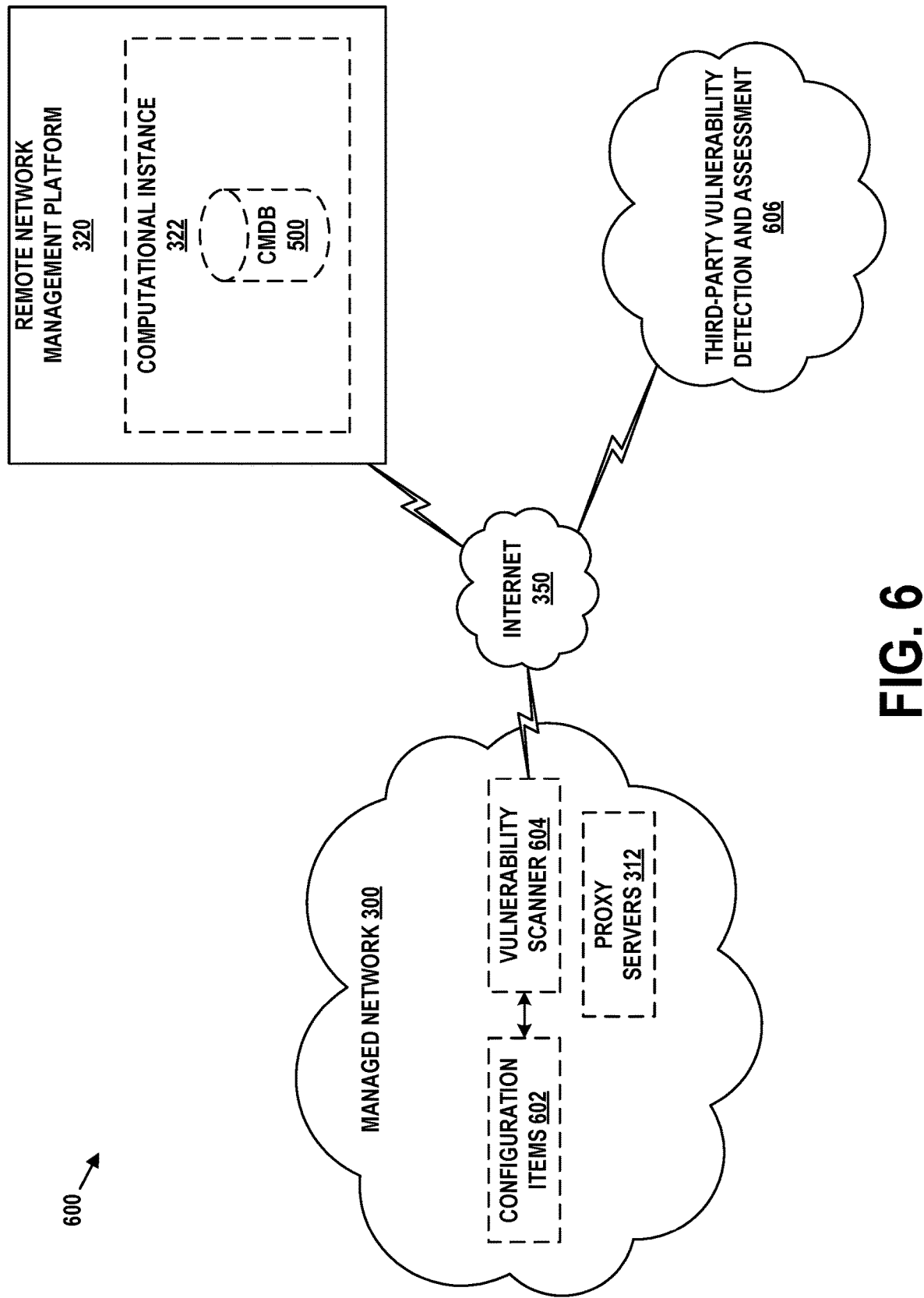
FIG. 6 depicts a communication environment involving a remote network management platform, managed network, and third-party vulnerability detection and assessment platform, in accordance with example embodiments.

FIG. 6 depicts a vulnerability management architecture 600. Architecture 600 includes managed network 300, remote network management platform 320, and third-party vulnerability detection and assessment cloud 606 (referred to as cloud 606 for short), all connected by Internet 350.

Managed network 300 is largely the same as shown in FIG. 3, but just showing configuration items 602, vulnerability scanner 604, and proxy server(s) 312. Each of configuration items 602 may represent a virtual or physical computing device and/or a software application installed upon such a computing device. Vulnerability scanner 604 may be a dedicated unit of software and/or a virtual or physical computing device that is deployed within managed network 300 to detect vulnerabilities relating to configuration items 602. Proxy server(s) may take on the same or similar functionality as described above.

In some embodiments, vulnerability scanner 604 may include a software agent that is deployed on multiple endpoints, where each endpoint is represented as one or more of configuration items 602. In these or other embodiments, vulnerability scanner 604 may include one or more software applications deployed on one or more dedicated computing devices. In either situation, vulnerability scanner 604 may scan or otherwise remotely access configuration items 602 to detect vulnerabilities. For example, vulnerability scanner 604 may scan configuration items 602—e.g., probe for open TCP/IP ports on computing devices, and/or log on to computing devices to determine the operating system, software applications installed thereon, and versions thereof. In some embodiments, vulnerability scanner 604 may store the results of these scans locally, or may transmit the results to cloud 606.

Remote network management platform 320 is the same or similar to that of FIG. 3, but showing only one computational instance, computational instance 322, for sake of simplicity. Computational instance 322 includes CMDB 500. As described above, CMDB 500 may include representations of configuration items 602, including multiple attributes for each.

Cloud 606 is an optional component that might not be present when vulnerability scanner 604 stores the results of scans locally. However, when present, cloud 606 receives these results, and cloud 606 may store and assess the results. For instance, cloud 606 may identify vulnerabilities based on the operating system and version thereof, operating system configuration, software application and version thereof, software configuration, and possible other metrics as well. The identified vulnerabilities may be stored and then made available by way of an interface, such as a web-based graphical user interface, a JavaScript Object Notation (JSON) interface, an XML interface, or some other form of interface.

In particular, computational instance 322 may be configured to obtain the identified vulnerabilities from cloud 606, or from vulnerability scanner 606 by way of proxy server(s) 312. As discussed in more detail below, computational instance 322 may combine this information with additional information from CMDB 500 to provide an overall risk score per vulnerability. These risk scores may be used to prioritize how security managers of managed network 300 address vulnerabilities.

Figure 7:
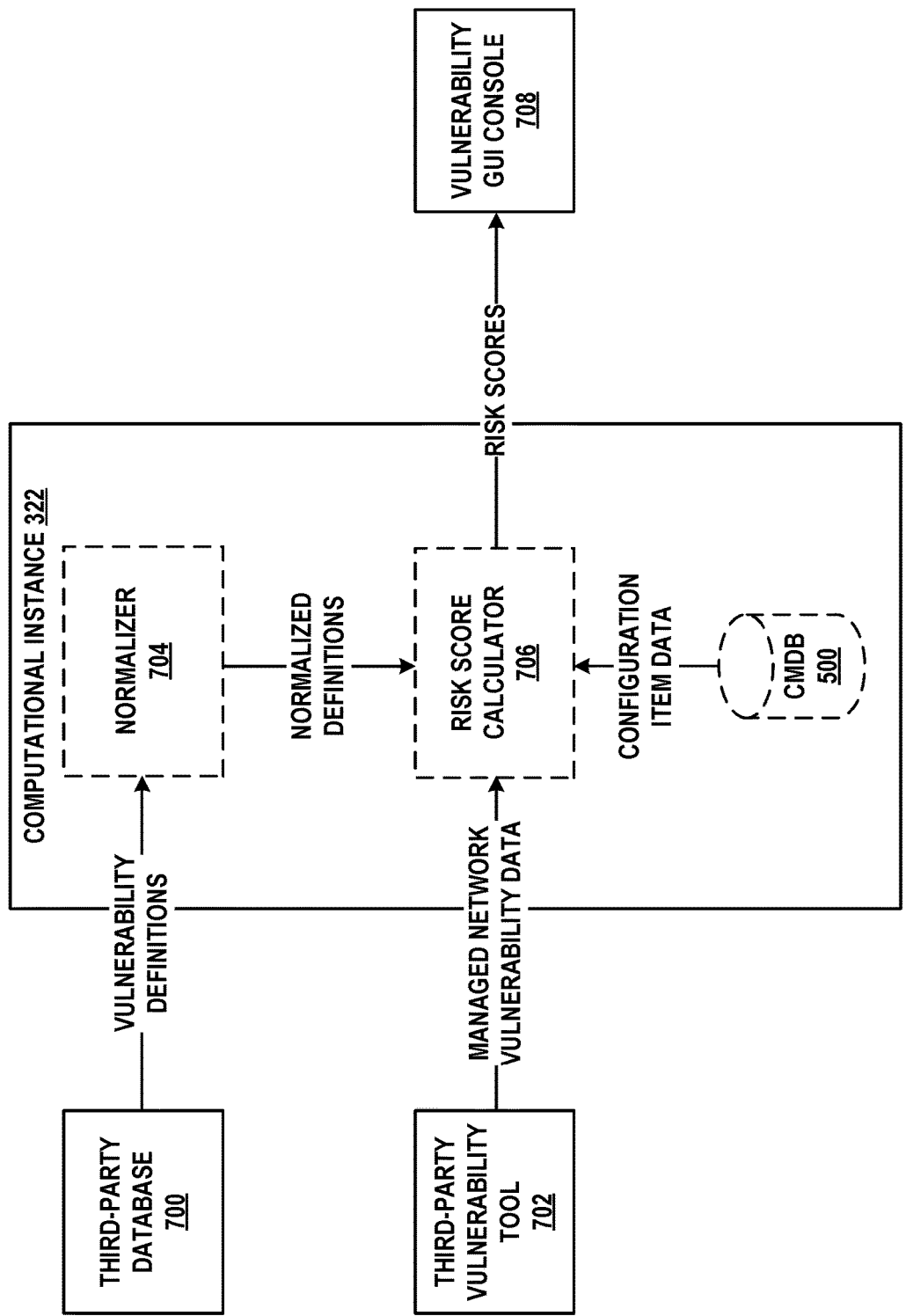
FIG. 7 depicts a vulnerability data flow, in accordance with example embodiments.

FIG. 7 provides further aspects of these procedures. Third-party database 700 contains definitions of vulnerabilities, which may include a severity and/or an exploitability ranking for each known vulnerability. Third-party database 700 may be a governmental or commercial database.

Normalizer 704 of computational instance 322 may obtain the vulnerability definitions from third-party database 700. Normalizer 704 may then map these definitions to normalized definitions used by computational instance 322. This normalization may be desirable if at least some third-party vulnerability databases use different scales to evaluate the severity and/or exploitability of vulnerabilities. For example, computational instance 322 may use a vulnerability severity scale (from most severe to least severe) of critical, high, medium, low, and none, while third-party database may use a vulnerability severity scale (from most severe to least severe) of important, moderate, and optional. Normalizer 704 may be configured to convert the vulnerability definitions from third-party database 700 to the normalized definitions by, for instance, mapping important severities to critical severities, moderate severities to medium severities, and optional severities to low severities. Other severity mappings may be possible and similar mappings may exist for the exploitability scales. Thus, normalizer 704 may be configured to normalize definitions from multiple third-party sources.

Once the vulnerability definitions are normalized, they are provided to risk score calculator 706. Risk score calculator 706 also obtains vulnerability data regarding a managed network (e.g., managed network 300) from third-party vulnerability tool 702. As noted above, computational instance 322 may retrieve this data from a managed network or from cloud 606. This vulnerability data may include, for each vulnerability identified in the managed network, a severity rating and/or an exploitability rating for the vulnerability, as well as references to the configuration items impacted by the vulnerability. Risk score calculator 706 may use the normalized definitions to map the severity and/or exploitability ratings from the vulnerability data to their normalized values.

Risk score calculator 706 may also obtain information from CMDB 500 regarding the importance of configuration items impacted by the vulnerability. For example, a web server device may be designated with high importance, while a client device used in a lab environment may be designated with low importance. The higher the importance of a configuration item impacted by a vulnerability, the more precedence should be given to addressing this vulnerability.

Risk score calculator 706 may also obtain information from CMDB 500 regarding the exposure of the configuration items impacted by the vulnerability. For example, an Internet-facing device has more exposure to vulnerabilities than a device internal to a managed network. Thus, Internet-facing devices impacted with a vulnerability should be addressed with higher priority than internal devices with the same vulnerability.

From this input, risk score calculator 706 provides risk scores for each combination of vulnerability and configuration item. The combination of a vulnerability found on a configuration item and that configuration item may be referred to a vulnerable item. Thus, a risk score per vulnerable item is produced. For instance, if a computing device is subject to two vulnerabilities, they would be referred to as two separate vulnerable items and thus two separate risk scores are provided. Or if multiple computing devices are subject to the same vulnerability, each computing device and vulnerability combination is a separate vulnerable item and one risk score per each of these vulnerable items is provided.

The risk score may be calculated in various ways from the vulnerability severity, vulnerability exploitability, configuration item (CI) importance, and CI exposure information obtained by risk score calculator 706. For instance, each discrete value for vulnerability severity, vulnerability exploitability, CI importance, and CI exposure may map to a number, and the risk score may be calculated as a weighted sum of these numbers. Further, the risk score may be calculated so that it is within a given range (e.g., 0-100, where 0 indicates no risk and 100 indicates the highest level of risk). These risk scores may be displayed in vulnerability graphical user interface console 708 and used by security managers to prioritize the vulnerabilities that they address.

This represents an advance over previous ways of calculating risk scores for vulnerabilities that only considered vulnerability severity, and involved a basic mapping from vulnerability severity to risk score (e.g., the greater the severity the higher the risk). The embodiments herein provide ways to produce risk scores that are more realistic and representative of the actual threats presented by vulnerabilities found on particular devices.

Figure 8:
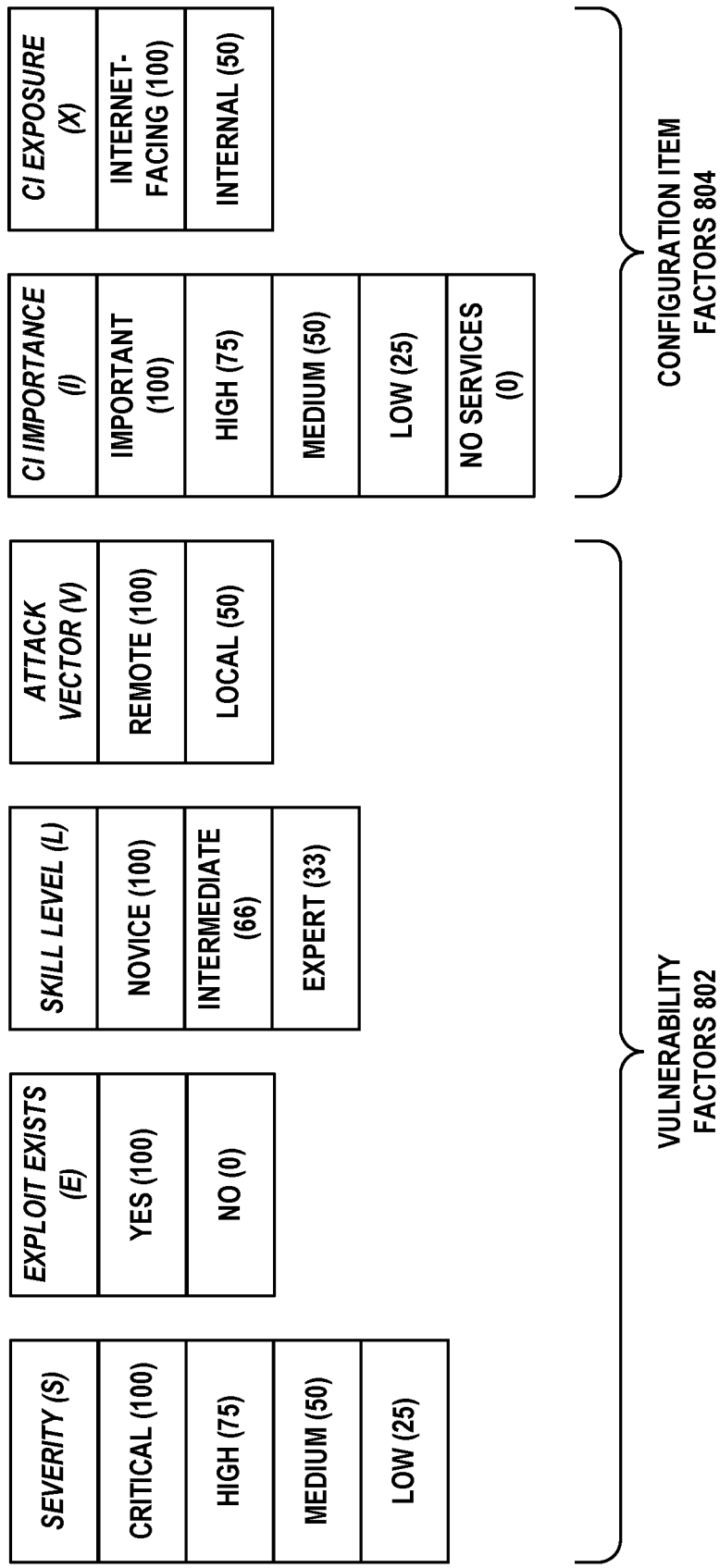
FIG. 8 depicts a set of vulnerability factors and configuration item factors, in accordance with example embodiments.

As an illustration of how a risk score is calculated, FIG. 8 provides a number of factors 800 used in risk score calculation. These include factors that are characteristics of the vulnerability (labelled as vulnerability factors 802) and factors that are characteristics of the configuration item (labelled configuration item factors 804).

The vulnerability factors 802 include the aforementioned severity and whether an exploit exists. If the exploit does exist, the skill level needed to take advantage of the exploit as well as the attack vector of the exploit can also be taken into consideration. Consistent with the discussion above, severity has four possible values (critical, high, medium, and low), exploit exists has two possible values (yes and no), skill level has three possible values (novice, intermediate, and expert), and attack vector has two possible values (remote and local). The configuration item factors 804 include CI importance and CI exposure. CI importance has five possible values (important, high, medium, low, and no services), and exposure exists has two possible values (Internet-facing and internal).

Each possible value of factors 800 is associated with a number between 0 and 100, inclusive. These numbers are used to calculate the risk score, with higher value indicating a bigger contribution to the overall risk. Thus, a severity of critical, which has a value of 100, is considered to be twice as severe as a severity of medium, which has a value of 50. Values may be assigned to levels in various ways and the assignments in FIG. 8 are for purposes of illustration.

There may be dependencies between some of factors 800. In FIG. 8, the skill level and attack vector factors are dependent on the exploit exists factor, because if an exploit is not known to exist, then there will be no skill level or attack vector associated with it. Thus, the skill level and attack vector factors are only relevant when exploit exists is yes.

Each factor 800 is also associated with a letter—S for severity, E for exploit exists, L for skill level, V for attack vector, I for CI importance, and X for CI exposure. These letters are used to represent the values of each of factors 800 in the risk score calculation. User-defined weights are associated with each factor as well, to provide an overall risk score (RS) equation of:

$$RS = w_S S + w_E E + w_L L + w_V V + w_I I + w_X X$$

where the sum of all weights ($w_S + w_E + w_L + w_V + w_I + w_X$) is 1.0. In some embodiments, non-integer risk scores may be rounded to the nearest integer or rounded up.

As an example, suppose that the weights are set as follows: $w_S = 0.5$, $w_E = 0.1$, $w_L = 0.05$, $w_V = 0.05$, $w_I = 0.15$, and $w_X = 0.15$. Then, for a vulnerable item with a severity of high, for which an exploit exists, with a skill level of novice, an attack vector that is local, an CI importance of low, and an CI exposure of Internet-facing, the risk score is calculated as:

$$RS = (0.5)(75) + (0.1)(100) + (0.05)(100) + (0.05)(50) + (0.15)(33) + (0.15)(100) = 74.95$$

In another example, a vulnerable item with a severity of low, for which an exploit does not exist, a CI importance of high, and a CI exposure of internal, the risk score is calculated as:

$$RS = (0.5)(25) + (0.1)(0) + (0.15)(100) + (0.15)(50) = 35$$

This latter calculation omits the skill level and attack vector factors because an exploit does not exist. Regardless, the first vulnerable item should be given a higher priority than the second vulnerable item because it has a higher risk score.

In addition to the factors described above, numerous other factors may be used. As just one example, an impact factor may measure a vulnerability's impact on data confidentiality, data integrity, and service availability.

VII. CHANGE REQUESTS AND VULNERABLE ITEMS

In order to have a regulated process for implementing changes over computer hardware and software (e.g., CIs) in a managed network, many enterprises employ a change tracking application. Such an application may be implemented in a web-based fashion and may be executable on a computational instance of a remote network management platform.

As an example of the operation of a change tracking application, a change request may be submitted to the system by a user, such as an IT manager, other IT professional, or end user. The change request can record information describing the change, its priority, a target completion time (also referred to as a target remediation time), a state, to whom the change request is assigned, and possibly other information as well. Less information may also be possible in change requests. The change tracking software application may facilitate managing the lifetime of the change request and scheduling the implementation thereof.

Ultimately, each change request may involve adding, modifying, and/or removing CIs. For example, change requests may involve applying a patch or update to the operating system or an application on a number of computing devices in the managed network, changing the configurations of some of the computing devices, removing a set of the computing devices from service, or adding one or more computing devices to the managed network. Other possibilities exist.

As noted above, vulnerabilities may also be tracked, in some cases by way of a vulnerability response application of the computational instance. This application may facilitate the creation, specification, and assignment of vulnerable items. Each vulnerable item may be associated with any of vulnerability factors 802 and/or configuration item factors 804.

Vulnerability groups may also be defined and managed in a vulnerability response application. Each vulnerability group may contain one or more vulnerable items with some form of similarity, e.g., being the same type of computing device, operating the same software, and/or being in the same physical location. The vulnerable items in a vulnerability group also share at least some vulnerabilities; however, different vulnerable items in the same group may not all have the same vulnerabilities.

As an example, a vulnerability group may contain a number of server devices using patch level A of an operating system, as well as a number of server devices using patch level B of the operating system. Due to a defect in both versions of the operating system, all of these server devices are subject to vulnerabilities (and are thus vulnerable items), but the vulnerabilities for those using patch level A of the operating system have a higher risk score than those using patch level B of the operating system. Both sets of server devices may be placed in the same vulnerability group, however, because upgrading the server devices to patch level C of the operating system will address all of the vulnerabilities.

In general, using vulnerability groups is a convenience, especially for large managed networks, as it allows vulnerable items to be tracked in bulk rather than one at a time. This reduces the complexity and increases the efficiency of vulnerability management.

A limitation of current systems is that vulnerable items and change requests are maintained in different and independent repositories (e.g., databases or database tables) within a computational instance. Thus, as the number of vulnerable items grows, it can be difficult to determine which have been addressed by what change requests. Failure to properly address a vulnerable item can result in a security breach in the managed network, potentially causing disruption of enterprise services, losses of data and other assets, loss of revenue, and loss of personnel time. Therefore, it is desirable for there to be improved systems that better coordinate vulnerable items and change requests. Doing so can have an immediate and beneficial impact on the security and integrity of the managed network.

The embodiments herein provide a bi-directional integration in which vulnerable items and change requests can be cross-referenced to one another in an automated and user-friendly fashion. Through use of graphical user interfaces and underlying programmatic logic, various useful aspects of this integration can be achieved.

In one aspect, the embodiments herein streamline the process of creating a change request for a vulnerability group by auto-populating relevant data fields in the change request with information from the vulnerability group. In another aspect, these embodiments allow existing change requests to be associated with a vulnerability group. In another aspect, the embodiments allow for existing vulnerability groups to be split into two different vulnerability groups. In another aspect, the embodiments allow for automatic state synchronization between change requests and their associated vulnerability groups, such that as a change request progresses through the phases of its lifecycle, the vulnerability group will also be moved through its phases of the lifecycle.

The figures accompanying the following description provide specific examples of graphical user interfaces. Nonetheless, the embodiments herein may use different layouts, styles, widgets, and workflows. For example, different arrangements of information and different types of menus and selection mechanisms may be used.

A. Creating Change Requests for Vulnerability Groups

Figure 9A:
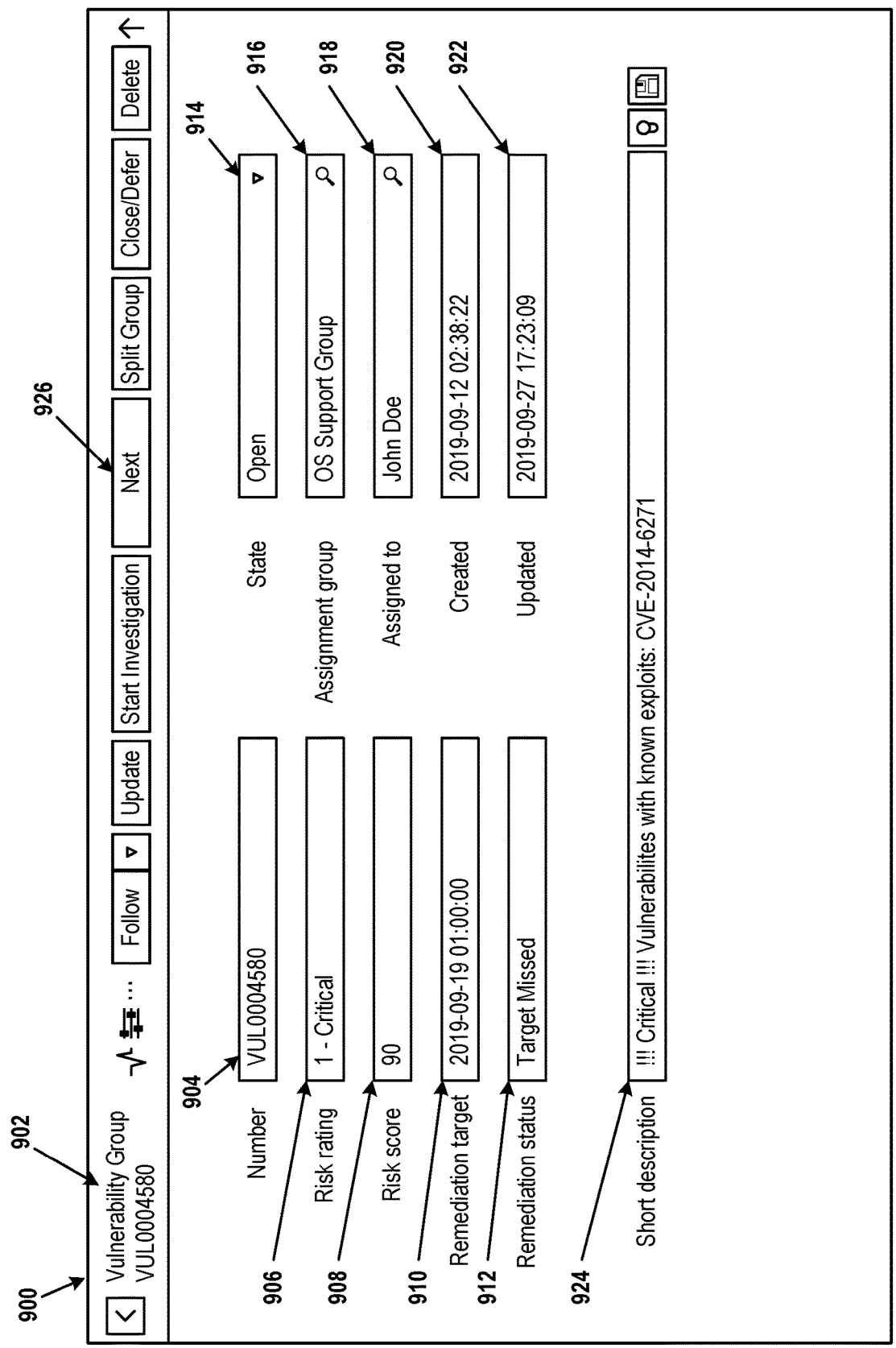
FIG. 9A depicts a graphical user interface related to creating a change request from a vulnerability group, in accordance with example embodiments.

FIG. 9A depicts an example graphical user interface 900 of a vulnerability response application. In particular, graphical user interface 900 displays the fields and values thereof stored for a vulnerability group. For purposes of illustration, some of possible fields are described below.

Identifier 902 is a unique alphanumeric sequence that can be used to specify the vulnerability group, in this case VUL0004580. Identifier 902 may also be referred to as a vulnerability group number, and is also shown in field 904.

Field 906 shows an aggregate risk rating of the vulnerability group. For a single vulnerable item, this can be based the severity factor of vulnerability factors 800. Similarly, field 908 shows an aggregate risk score of the vulnerability group, which can be associated with the overall risk score calculated from vulnerability factors 800 as discussed above. When the vulnerability group contains multiple vulnerable items having different risk ratings and/or risk scores, the highest risk rating and/or risk score of these may be displayed. The risk rating and risk score for a vulnerability group may be recalculated on a periodic basis (e.g., once per day), and thus may not always reflect the latest changes made to the vulnerability group. A risk rating and/or a risk score of a vulnerability group may be collectively referred to herein as a "criticality" or "criticality level" of the vulnerability group.

Field 910 shows an aggregate remediation target time for the vulnerability group. Each vulnerable item may have its own respective remediation target time, which specifies when the vulnerable item should be resolved. This time may be determined based on the criticality of the vulnerability group, an enterprise's operating procedures, or an external regulation. When the vulnerability group contains multiple vulnerable items having different remediation target times, the earliest remediation target time of these may be displayed. As was the case for risk rating and risk score, the remediation target time for a vulnerability group may be recalculated on a periodic basis (e.g., once per day), and thus may not always reflect the latest changes made to the vulnerability group.

Field 912 shows the remediation status of the vulnerability group, which indicates whether the vulnerable items in the vulnerability group were sufficiently addressed by the remediation target time of field 910. The values of field 912 can be approaching target, in-flight, or target missed.

Field 914 is a drop-down menu that represents the state of the vulnerability group. This state may be one of open, under investigation, awaiting implementation, resolved, deferred, or closed, for example.

Field 916 shows the assignment group currently assigned to the vulnerability group. The assignment group is an individual or a number of individuals within the enterprise, such as an IT department. The possible values of field 916 may be defined by the enterprise.

Field 918 displays the name of an individual assigned to address the vulnerable items in the vulnerability group. This individual may be an IT professional, perhaps a member of the assignment group shown in field 916.

Field 920 shows the time that the vulnerability group was created, and field 922 shows the time the vulnerability group was last updated. The value of field 922 may be automatically updated whenever a change is made to the vulnerability group.

Field 924 shows a short description relating to the vulnerability group. This short description may include an indication of the criticality of the vulnerable items as well as a reference to a known exploit (e.g., CVE-2014-6271 from the NIST database) impacting the vulnerability group, if applicable.

Button 926 may be a graphical element that is actuatable to cause a change to graphical user interface 900 or to cause another graphical user interface to appear. In the case of button 926, this change is to cause graphical user interface 930 to be displayed.

Graphical user interface 900 may contain additional fields and graphical elements, and may be arranged in various layouts. Moreover, some fields and graphical elements shown in FIG. 9A (such as a number of the buttons and widget at the top of the figure) are not discussed in detail for purposes of brevity.

Figure 9B:
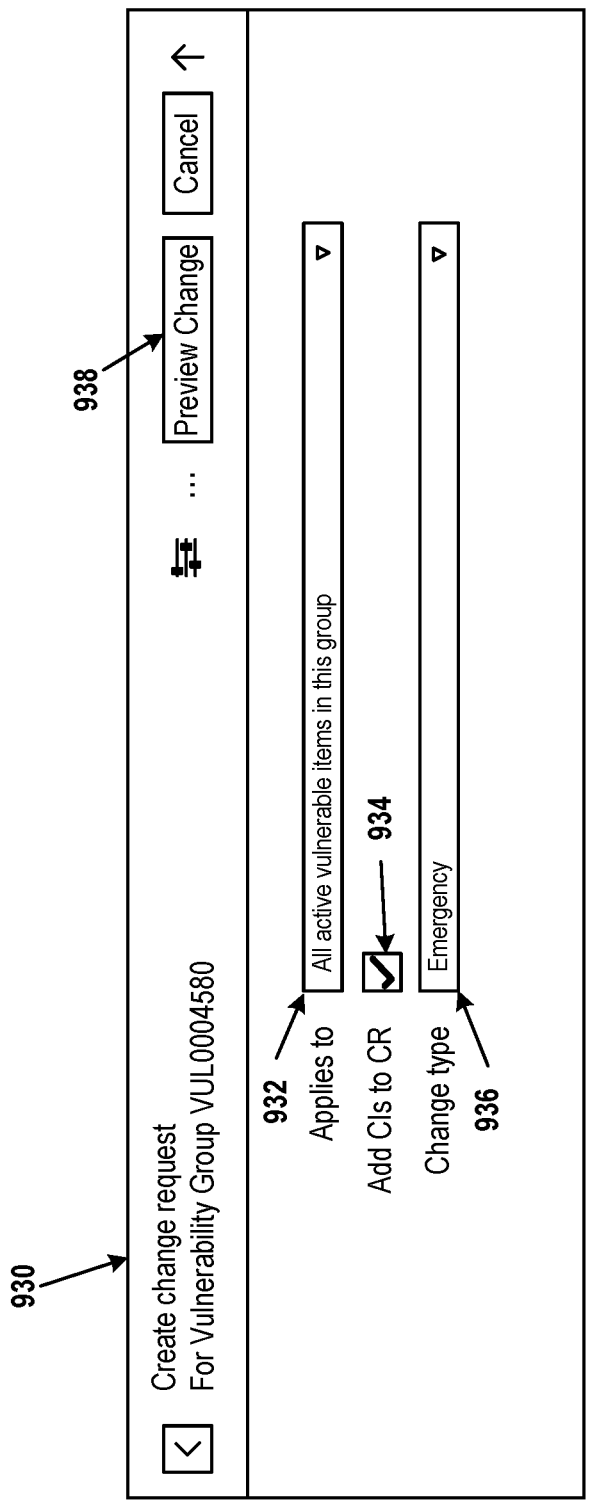
FIG. 9B depicts another graphical user interface related to creating a change request from a vulnerability group, in accordance with example embodiments.

FIG. 9B depicts example graphical user interface 930. As noted, actuating button 926 may cause graphical user interface 930 to appear.

Notably, field 932 is a drop-down menu that can be used to select between whether the new change request applies to all the vulnerable items of the vulnerability group or only the vulnerable items that match a set of conditions. If the user chooses to only apply the change request to the vulnerable items that match the set of conditions, the variation of graphical user interface 930 shown in FIG. 9C will be shown. Otherwise, the change request will apply to all vulnerable items.

Field 934 is a check box determining whether to add representations of the CIs associated with the vulnerability group to the change request. In some embodiments, a set of CI identifiers will be added so that IT personnel can easily determine which computing devices and/or software applications are impacted by the change request.

Field 936 is a drop-down menu that allows selection of the type of change request. These types may include emergency, standard, and normal. Herein, the type of the change request may also be referred to as the "urgency" of the change request. Emergency changes should be implemented as soon as possible, for example to resolve a major vulnerability or to implement an important security patch that addresses a widespread vulnerability. Standard changes are pre-authorized changes that are low risk, relatively common, and follow a well-understood procedure. For example, applying regularly-scheduled third-party software patches may be considered to be standard changes. Normal changes are those that are neither emergency nor standard. In some cases, selection of the type of change request can cause more fields to be added to graphical user interface 930 (these are not shown in FIG. 9B for sake of simplicity).

Button 938 may be a graphical element that is actuatable to cause a change to graphical user interface 930 or to cause another graphical user interface to appear. In the case of button 938, this change is to cause graphical user interface 950 to be displayed.

Figure 9C:
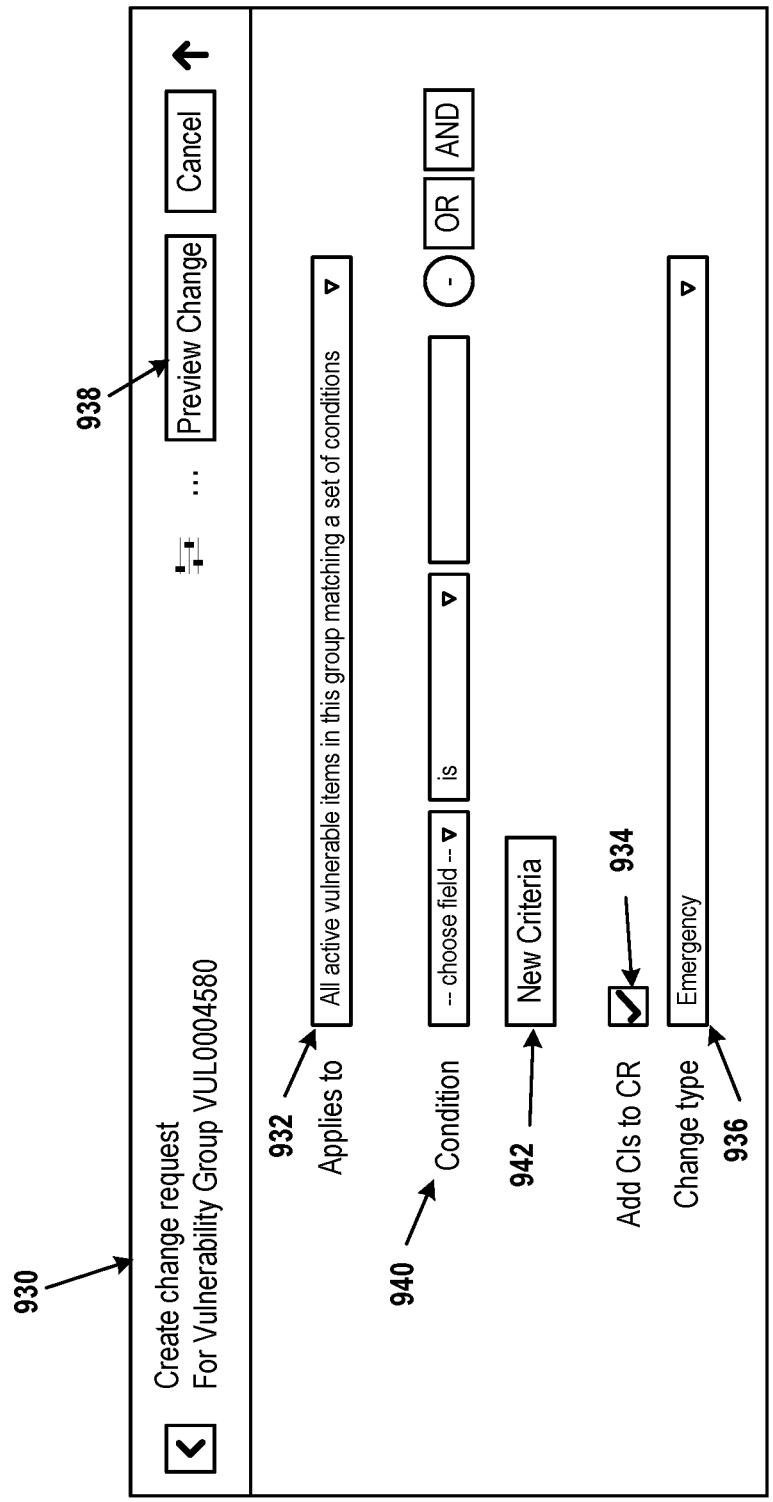
FIG. 9C depicts another graphical user interface related to creating a change request from a vulnerability group, in accordance with example embodiments.

FIG. 9C further illustrates what can be displayed on graphical user interface 930 when field 932 selects only the vulnerable items in the vulnerability group that match a set of conditions. Particularly, graphical user interface 930 expands to include fields 940 that allow specification of a condition. The condition may be based on a selectable field of the vulnerability group, an operator, and possibly a value of that field. For example, the field "state", the operator "is", and the value "open" may be specified. In another example, the field "risk score", the operator "greater than", and the value "90" may be specified.

Button 942 is a graphical element that allows addition of another condition to the filter. Actuation of button 942 may cause graphical user interface 930 to display another set of fields similar to fields 940. The OR and AND buttons at the end of field 940 (which would also be at the end of the new set of fields added by actuating button 942) allows filter expressions to be built based on Boolean combinations of conditions. For example, the filter expression "state is open AND risk score greater than 90" can be formed through use of two conditions. In this fashion, arbitrarily complex filter expressions can be specified.

Once a filter expression is defined, actuating button 938 may cause the creation of a new vulnerability group containing only the vulnerable items matching the filter expression. Alternatively, actuating button 938 may defer the creation of the new vulnerability group until creation of the change request (e.g., via button 960, described below). The vulnerable items are moved from their current vulnerability group to the new vulnerability group. The change request is associated with the new vulnerability group. In the case of a preview, graphical user interface 930 may provide additional information prior to creating the new vulnerability group, such as providing a list of vulnerable items that would be placed in that vulnerability group. In some cases, a preview list of vulnerable items matching the condition may be displayed before the change request is created.

Regardless of how it is created, a change request may include a number of fields. Advantageously, the system may present a preview of these fields before prompting the user to create the change request. FIG. 9D depicts such a preview for a change request with a change type of emergency.

Particularly, graphical user interface 950 is a preview that may be a new graphical user interface or an expansion upon graphical user interface 930. Notably, graphical user interface 950 includes the information from graphical user interface 930, as well as other information that is auto-populated from the vulnerability group.

Field 952 is labeled "Priority" and may be based on the risk rating and/or risk score of fields 906 and 908, respectively. As was the case for fields 906 and 908, the value placed in field 952 may be an aggregate over a number of vulnerable items that are associated with the change request. For a single vulnerable item, this value can be based the severity factor of vulnerability factors 800. When the vulnerability group contains multiple vulnerable items having different risk ratings and/or risk scores, the highest risk rating and/or risk score of these may be displayed.

Field 954 is labelled "Planned end date" and may be based on the remediation target of field 910. As was the case for field 910, the value placed in field 954 may be an aggregate over a number of vulnerable items that are associated with the change request. This time may be determined based on the criticality of the vulnerability group, an enterprise's operating procedures, or an external regulation. When the vulnerability group contains multiple vulnerable items having different remediation target times, the earliest remediation target time of these may be displayed in field 954.

Notably, the values for fields 952 and 954 may be recalculated at the time of change request creation, and may only consider certain vulnerable items that are associated with the change request. For example, just vulnerable items matching a filter that is optionally specified as described above and/or vulnerable items in one or more of a particular set of states (e.g., open, under investigation, and awaiting implementation, but not resolved, deferred, or closed) may be used for the recalculations. This allows the priorities and planned end dates for a change request to more accurately reflect the risk, criticality, and remediation deadlines of the relevant underlying vulnerable items.

Field 956 provides an auto-populated justification for the change request. Certain values appearing in the text of the justification are parameterized. For example, the indication that the change request is required to address 9 vulnerabilities may be automatically generated based on the number of vulnerabilities of the vulnerable items associated with the change request. Further, the indication that these vulnerabilities impact 10 CIs may also be automatically generated based on the number of CIs associated with the change request. Additionally, the indication of the risk rating (highest of all vulnerable items) and the target remediation date (earliest of all vulnerable items) may be automatically generated as discussed above.

Field 958 is labelled "implementation plan" and may contain a description of the preferred solution to be implemented as the change. For example, the implementation plan shown involves applying an operating system patch to address the vulnerabilities. The information shown in field 958 may be obtained from the vulnerability group or an internal or external database related to the vulnerabilities in the vulnerability group.

Button 960 (appearing at two places in graphical user interface 950) is a graphical element that is actuatable to create the change request with the values shown. As indicated in graphical user interface 950, any of the text fields may be edited by a user before the change request is created. Actuation of button 960 may result in the change request being added to the change request database, and also may result in graphical user interface 970 being displayed.

FIG. 9E depicts graphical user interface 970, which confirms the creation of a new change request with the data as displayed in graphical user interface 950. Notably, the new change request is given a unique change request identifier (as shown in field 972) so that the change request can be tracked. In some cases, graphical user interface 970 may include options to display a list of vulnerable items and/or CIs associated with the change request.

FIG. 9F depicts graphical user interface 980, which is an alternative version of graphical user interface 950. Particularly, graphical user interface 980 is a preview for a change request with a change type of standard. As such, fields 982 and 984 indicate that the change category is "Patching Standard Changes" and the change template is "Microdyne Monthly Patching Cycle". A change template may be a framework for change requests that are expected to repeat, and may contain a predefined set of fields and possibly some common values pre-populated therein. Implementation plan 958 is omitted for purposes of simplicity.

B. Associating Vulnerability Groups to Existing Change Requests

In additional embodiments, rather than creating a new change request for association with some or all vulnerable items in a vulnerability group, an existing change request may be associated with the vulnerability group. This conveniently allows multiple vulnerability groups to be associated with the same change request.

Figure 10A:
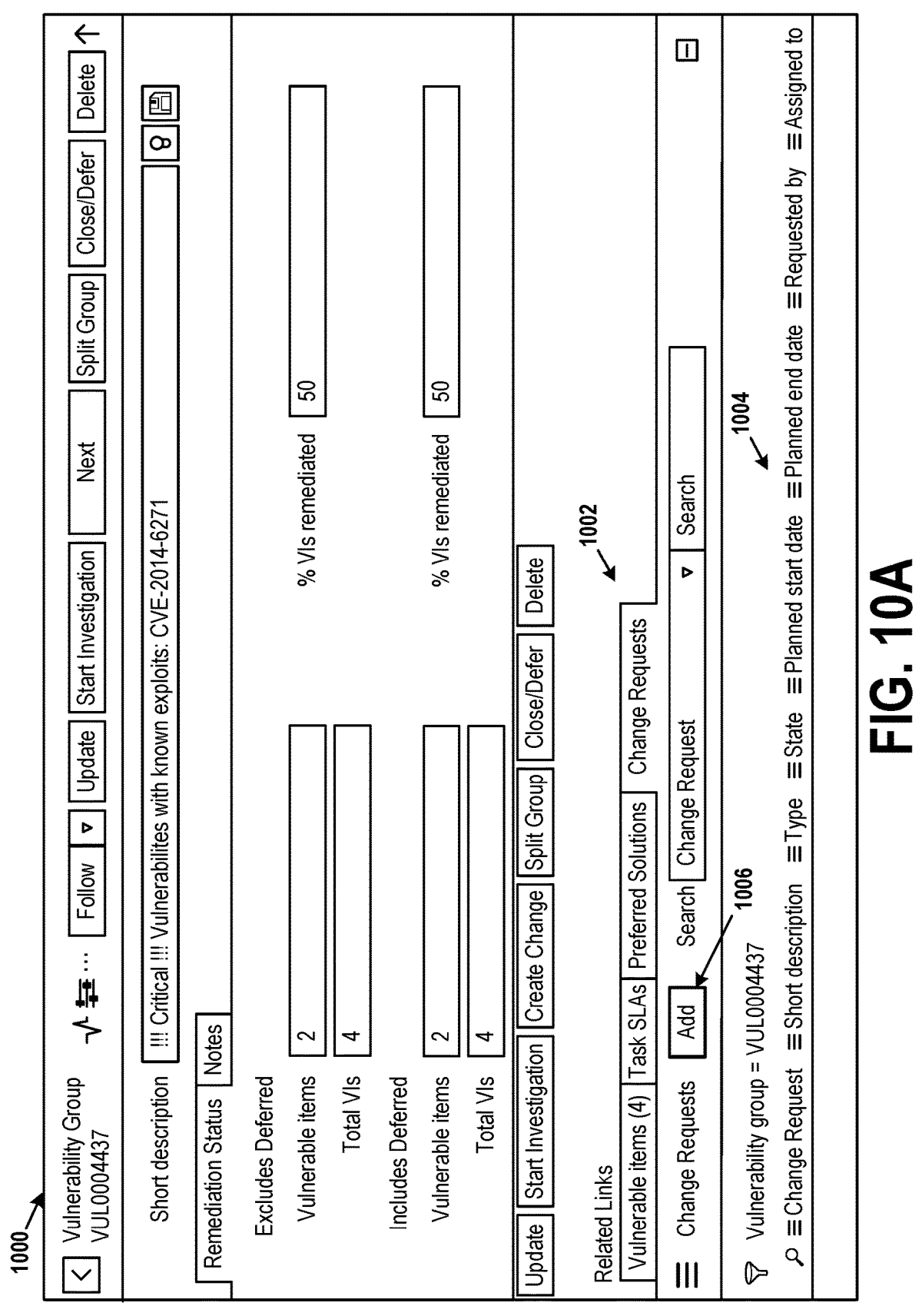

FIG. 10A shows example graphical user interface 1000, which provides a slightly different view of a vulnerability group. In addition to other information, graphical user interface 1000 displays a tabbed section 1002 entitled "Related Links". The tab for "Change Requests" is selected, which displays a list of change requests associated with the vulnerability group in section 1004. Currently, this list is empty.

Button 1006 is a graphical element that is actuatable to allow the user to associate an existing change request with the vulnerability group. Actuation of button 1006 may cause a search interface to be displayed, prompting the user to enter information related to a change request. Afterward, graphical user interface 1010 to be displayed.

Figure 10B:
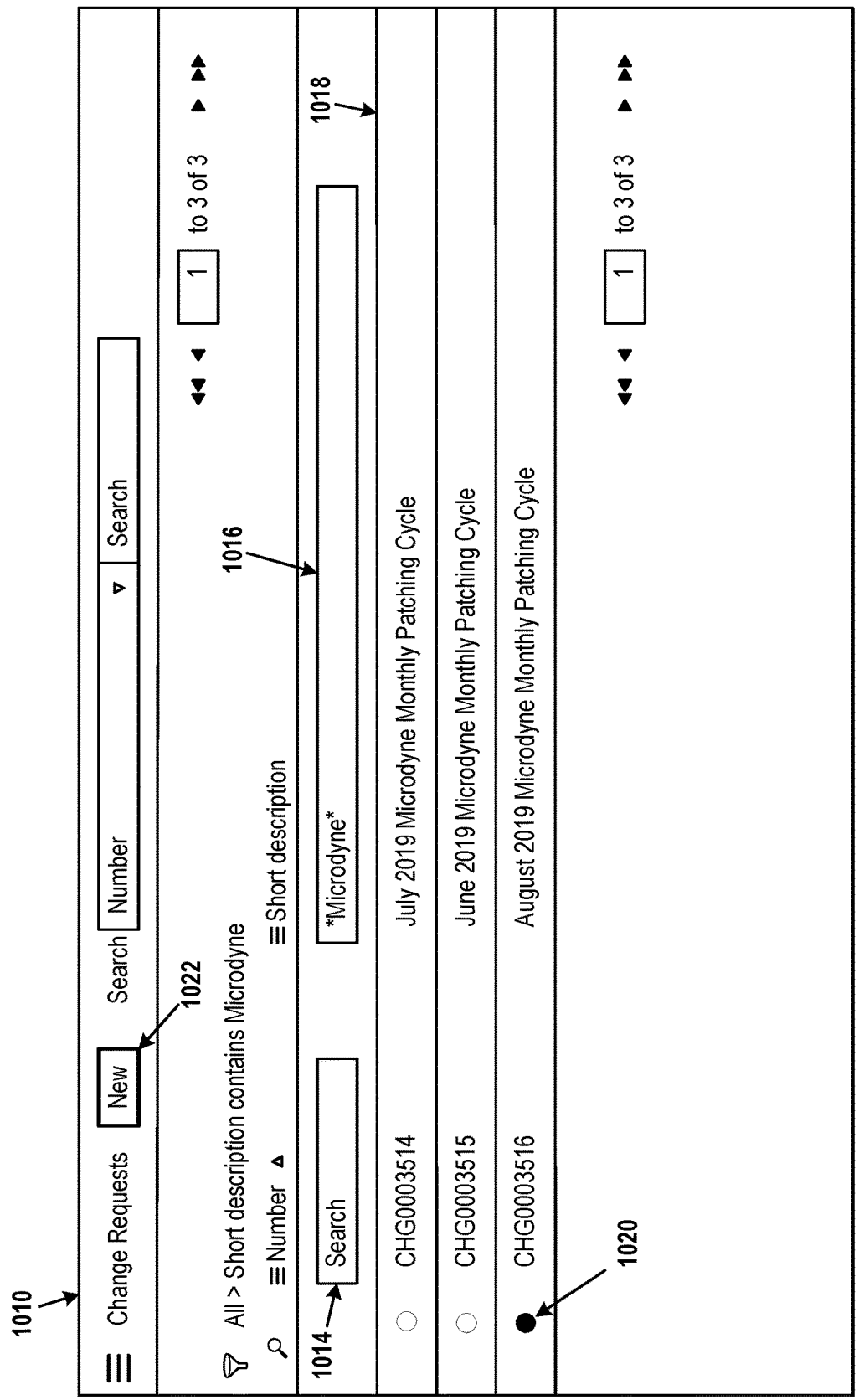
FIG. 10B depicts another graphical user interface related to linking a vulnerability group to an existing change request, in accordance with example embodiments.

FIG. 10B shows example graphical user interface 1010, which allows searching of change requests by change request number (which may be a unique identifier of a change request) as well as text from the short descriptions of change requests. Field 1014 is a text box that allows entry and searching of change request numbers, while field 1016 is a text box that allows entry and searching by short description.

As shown in FIG. 10B, field 1016 contains the entered text string "*Microdyne*" which uses a pair of wild card characters (*) to search for any short description containing the text "Microdyne". Search results 1018 shows three change requests matching this search. As indicated by button 1020 being colored in, change request CHG0003516 is selected for association with the vulnerability group.

Actuation of button 1022, another actuatable graphical element, may cause the association to take place. Once associated, the database entry for the vulnerability group may contain a reference to the change request and/or the database entry for the change request may contain a reference to the vulnerability group.

Figure 10C:
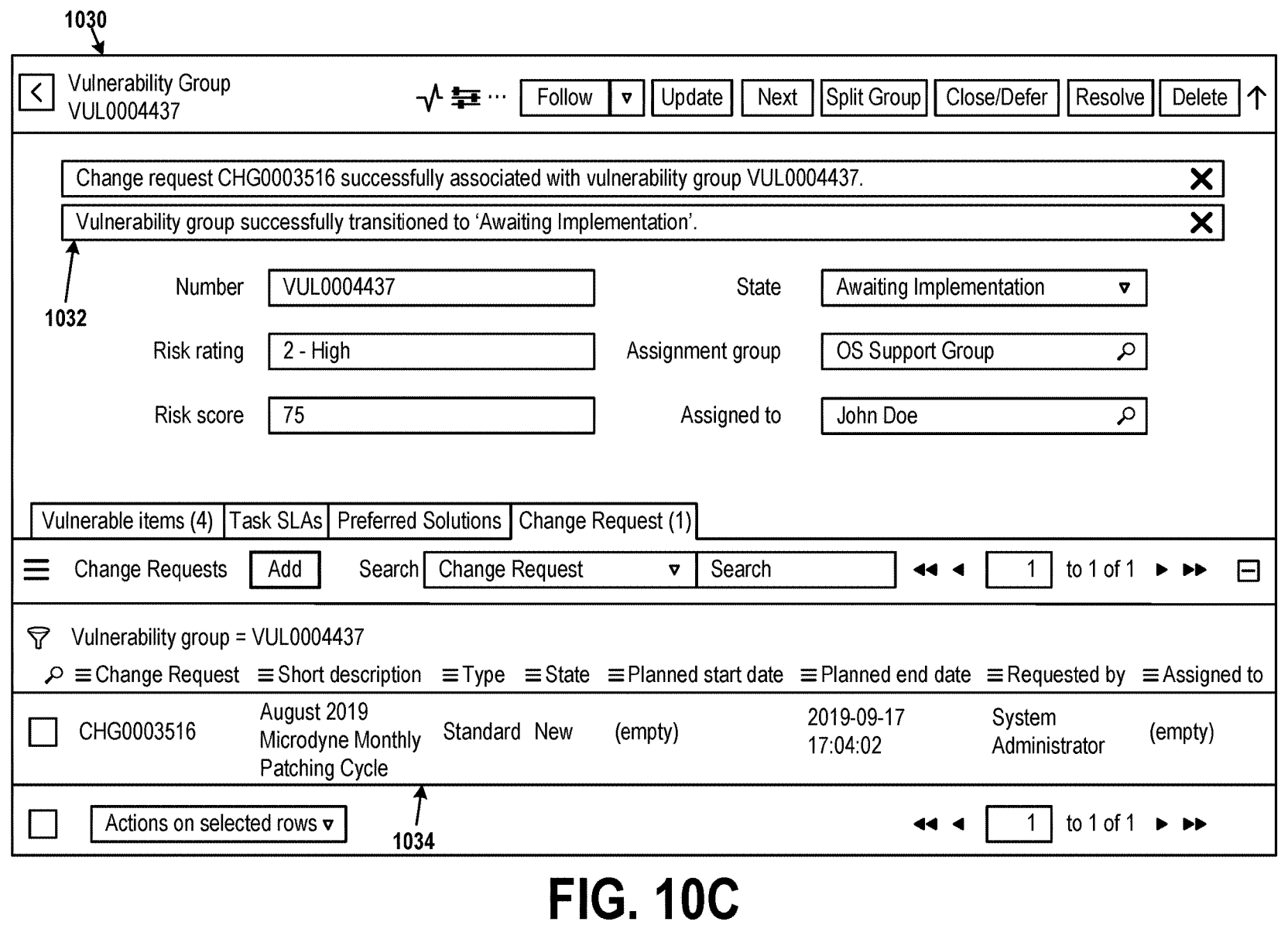

FIG. 10C shows example graphical user interface 1030 with the vulnerability group showing the added change request. Particularly, notifications 1032 indicate that the association has taken place and that the vulnerability group's state has been automatically changed to "awaiting implementation". Automatic state changes will be discussed in more detail below.

Line item 1034 shows the change request as being associated with the vulnerability group, including the change request's short description, type, state, planned start date, planned end date, requestor, and individual or group to which it is assigned. From example graphical user interface 1030, more change requests can be associated with the vulnerability group, the existing change requests can be disassociated with the vulnerability group, or other actions can be taken.

C. Splitting Vulnerability Groups

As discussed above, a vulnerability group can be split into two vulnerability groups by creating a new change request and using a filter expression to associate the change request with a subset of the vulnerable items in a vulnerability group. The vulnerable items that match the filter expression are moved to a new vulnerability group, while the vulnerable items that do not match the filter expression remain in the original vulnerability group. Vulnerability groups can also be split without creating a new change request. This section describes two methods for doing so.

Regarding the first method, FIG. 11A shows example graphical user interface 1100, which is similar to graphical user interface 900. Notably, button 1102 is a graphical element actuatable to split the displayed vulnerability group into two vulnerability groups. Actuating button 1102 may cause graphical user interface 1110 to appear.

Figure 11B:
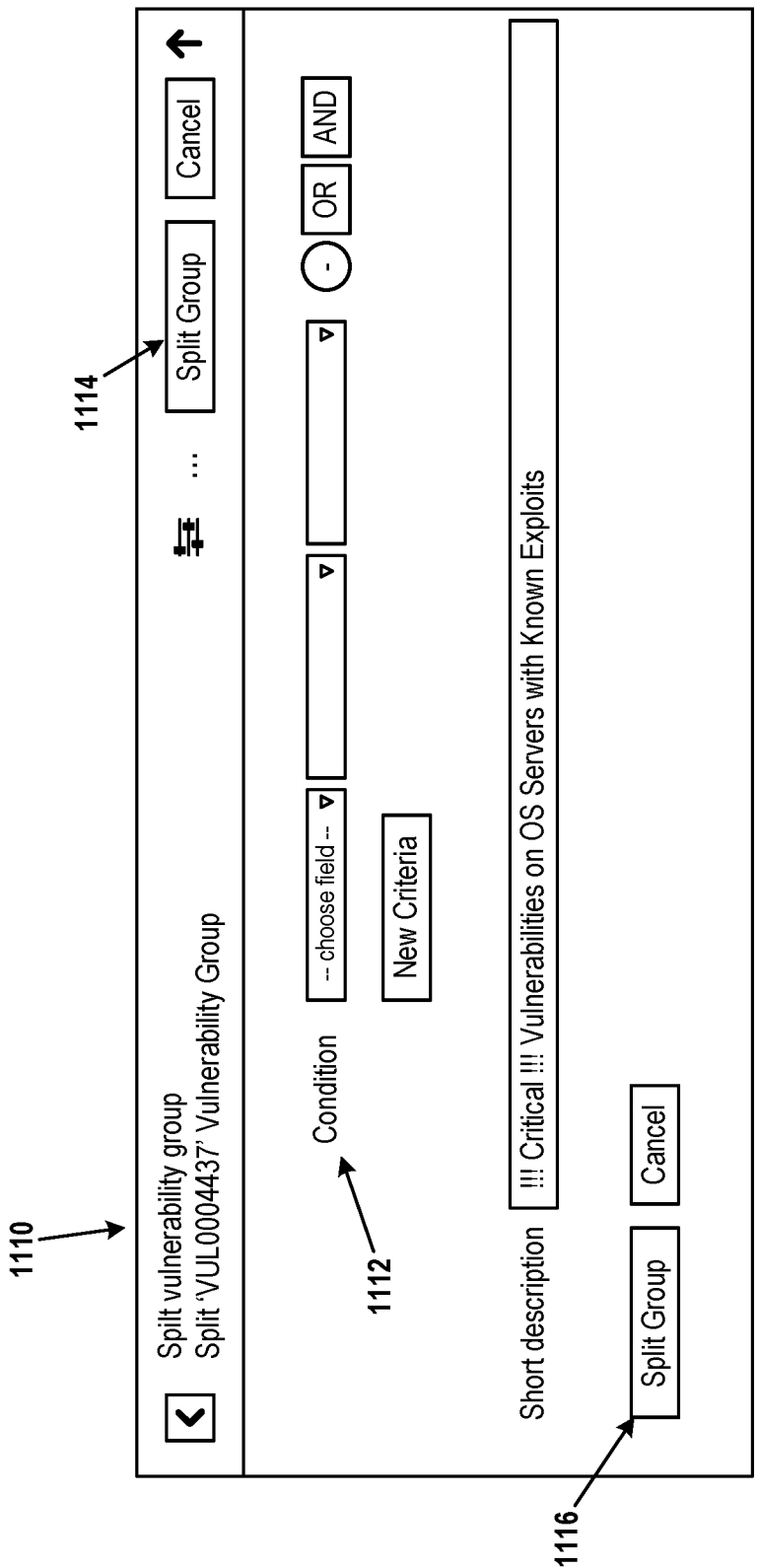
FIG. 11B depicts another graphical user interface related to splitting a vulnerability group, in accordance with example embodiments.

FIG. 11B shows graphical user interface 1110, which allows a filter expression to be specified. The specification may be similar to the mechanisms described in the context of FIG. 9C. For example, fields 1112 may be used to define one or more conditions that can be combined using Boolean operators into a Boolean filter expression.

Buttons 1114 and 1116 may be graphical elements actuatable to finalize splitting the vulnerability group based on the filter. Thus, in response to such actuation, a new vulnerability group is created and vulnerable items matching the filter expression are moved to the new vulnerability group. Further, the actuation may cause example graphical user interface 1120 to appear.

Figure 11C:
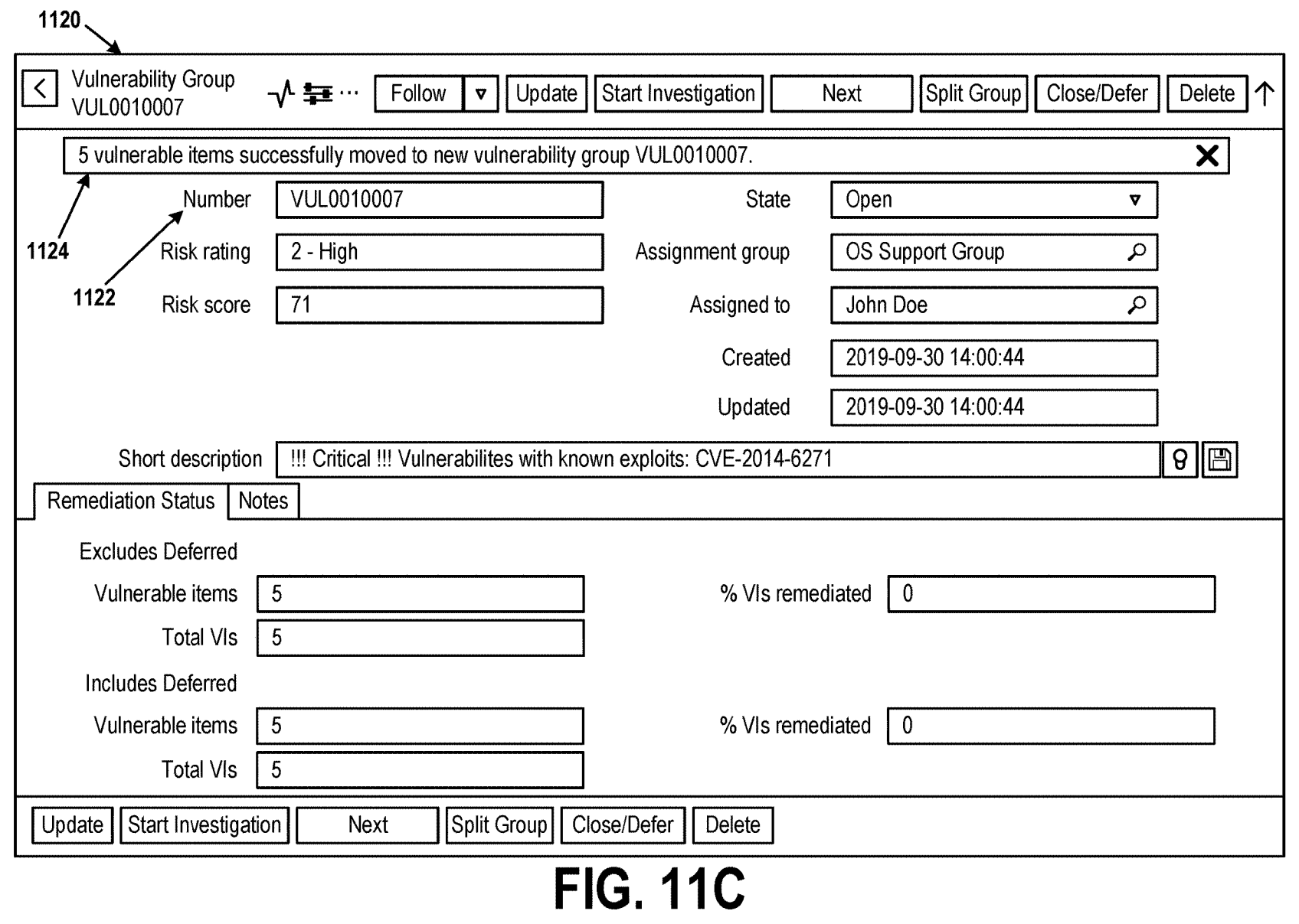

FIG. 11C depicts graphical user interface 1120, which displays the newly-created vulnerability group. Field 1122 shows that this vulnerability group has a different number (identifier) than the original vulnerability group. Notification 1124 indicates that five vulnerable items were moved to this vulnerability group. Otherwise, the new vulnerability group inherits many of the same properties as the original vulnerability group.

Regarding the second method, FIG. 11D shows example graphical user interface 1130. Of note is selectable tab 1132 that displays list 1134 of vulnerable items. By selecting checkboxes to the left of one or more vulnerable items in this list, these vulnerable items may be designated for moving to the new vulnerability group. For instance, selection of the split group option from drop-down menu 1136 may cause the new vulnerability group to be created and the selected vulnerable items moved thereto. Doing so may cause graphical user interface 1120 to appear. There is no need to specify a filter expression with this second method.

D. State Synchronization Between Vulnerability Groups and Change Requests

Figure 12:
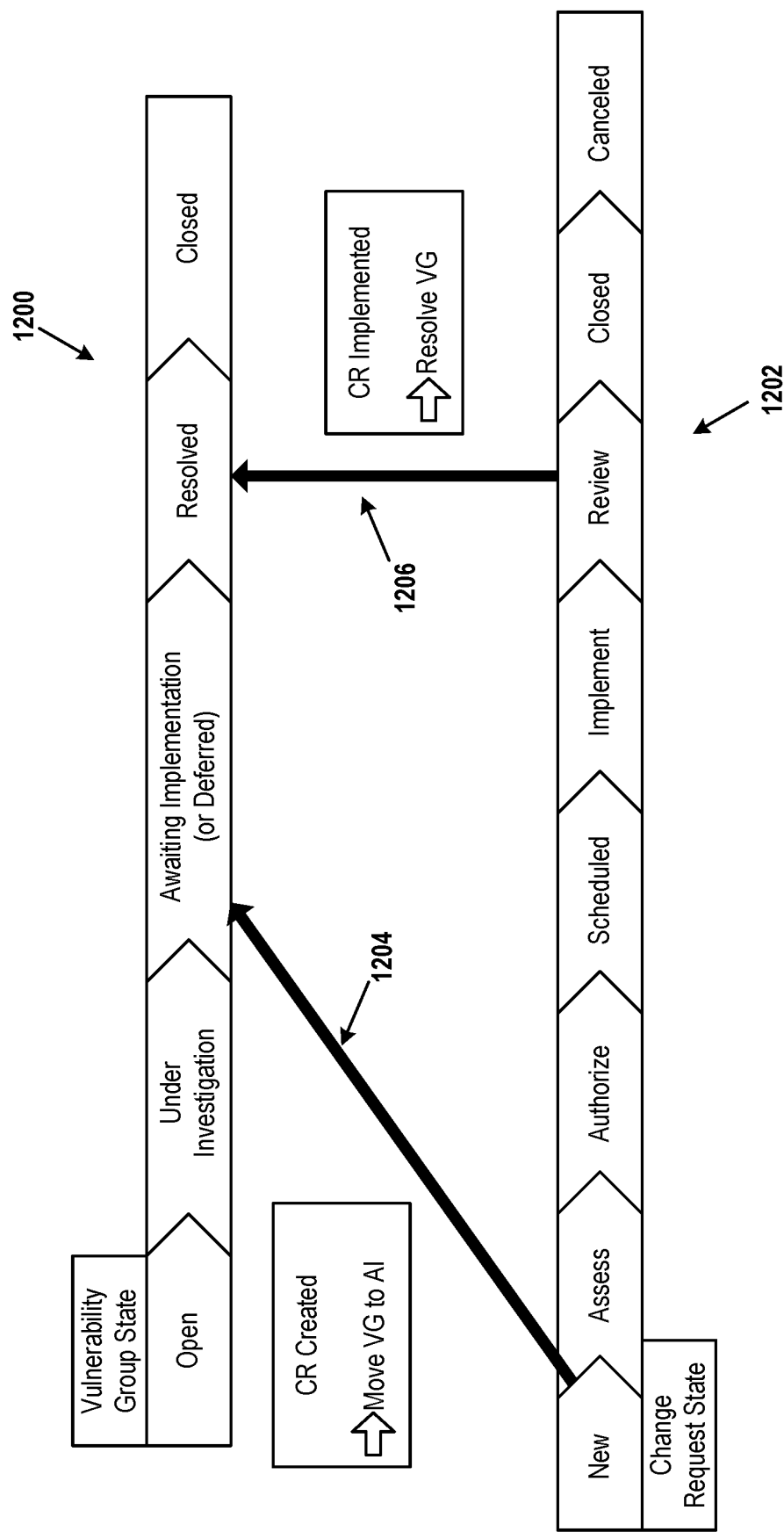
FIG. 12 depicts automatic state transitions for vulnerability groups based on state changes in associated change requests, in accordance with example embodiments.

In some embodiments, a state transition of a change request may automatically cause a state transition in one or more vulnerability groups associated with the change request. FIG. 12 depicts examples of this state synchronization.

This figure shows a linear representation of possible vulnerability group states 1200. Thus, vulnerability groups may begin in the open state, and then canonically transition to the under investigation state, the awaiting implementation state (or the deferred state), the resolved state, and then the closed state. But this representation is simplified, and more transitions than are shown might exist. For example, a vulnerability group in the resolved state may be transitioned back to the under investigation state if it is determined that the resolution did not properly address the vulnerable items.

Similarly, this figure also shows a linear representation of possible change request states 1202. Thus, change requests may begin in the new state, and then canonically transition to the assess state, the authorize state, the scheduled state, the implement state, the review state, the closed state, and/or the cancelled state. But this representation is simplified, and more transitions than are shown might exist.

As represented by arrow 1204 and the box to its left, when a new change request is created and associated with a vulnerability group, the vulnerability group may be automatically transitioned to the awaiting implementation state. Likewise, and as represented by arrow 1206 and the box to its right, when a change request associated with a vulnerability group transitions from the implement state to the review state, the vulnerability group may be automatically transitioned to the resolved state.

Other state synchronizations are possible. For example, if a change request transitions to the cancelled state, then the vulnerability group may automatically transition to under investigation.

When multiple change requests are associated with the same vulnerability group, only the state of the change request in the earliest state of the linear representation might be used to determine vulnerability group state transitions. Thus, if there are three change requests associated with a vulnerability group and two have transitioned to the review state and the third is still in the scheduled state, the vulnerability group may remain in the awaiting implementation state until the third transitions to the review state. Like, if the earliest change request is deleted, the next earliest change request may be found and used to determine the vulnerability group state.

By synchronizing change request and vulnerability group state in this fashion, vulnerability group state more accurately reflects the actual status of the associated change requests. This provides for a higher level of security and automation on the managed network, as vulnerabilities are more likely to be properly addressed in a timely fashion.

E. Other Features

In addition to the features above, the embodiments herein may exhibit other functionality. Some this functionality is described below.

One possible feature is that, after a change request is associated with a vulnerability group, a user (e.g., the user making the association or an administrator) is automatically notified if there are conflicts between this change request and other change requests already associated with the vulnerable items in the vulnerability group. This may involve the computational instance checking if any planned implementation times (e.g., the planned end date or remediation target is within a pre-determined range (e.g., 1 hour, 6 hours, 12 hours, 1 day, 7 days, 30 days, etc.) of that of another change request impacting at least some of the same vulnerable items. The user may be warned of a possible scheduling conflict between the change requests. In another example, the user may be notified if there is no available maintenance window for making changes to the CIs impacted by the change request in the time frame in which the change request is targeted for completion. The user may further be notified of the next available window of time to perform the change.

Another possible feature is that a change request may automatically be generated based on the risk rating, risk score, and/or criticality of the vulnerability group. Other factors may also be taken into consideration, such as the specific CIs impacted, to whom the vulnerability group is assigned, and/or exposure of the CIs. For example, a vulnerability group with a risk score of at least 90 with one or more externally exposed CIs may result in a change request being automatically created so that the vulnerabilities to which these CIs are subject can be mitigated.

Further, rules could be defined to decide when change requests will be created automatically. Thus, standard change requests (that are pre-approved and in some cases automatically deployed) could take advantage of the automatic creation of the change requests, to add tremendous efficiencies due to both the creation and the deployment of change requests being automated.

Yet another possible feature is to identify when a new change request addresses one or more of the same vulnerabilities that are already scheduled for mitigation by another change request. As an example, if 60 of 100 vulnerable items are scheduled have a patch applied in three days and a user creates a new change request to apply the patch to the 100 vulnerable items, the system may detect this overlap and suggest to the user that the new change request should only apply to the 40 vulnerable items that are not yet scheduled to be patched. Such an overlap may be based on information in implementation plan associated with change requests.

VIII. EXAMPLE OPERATIONS

Figure 13:
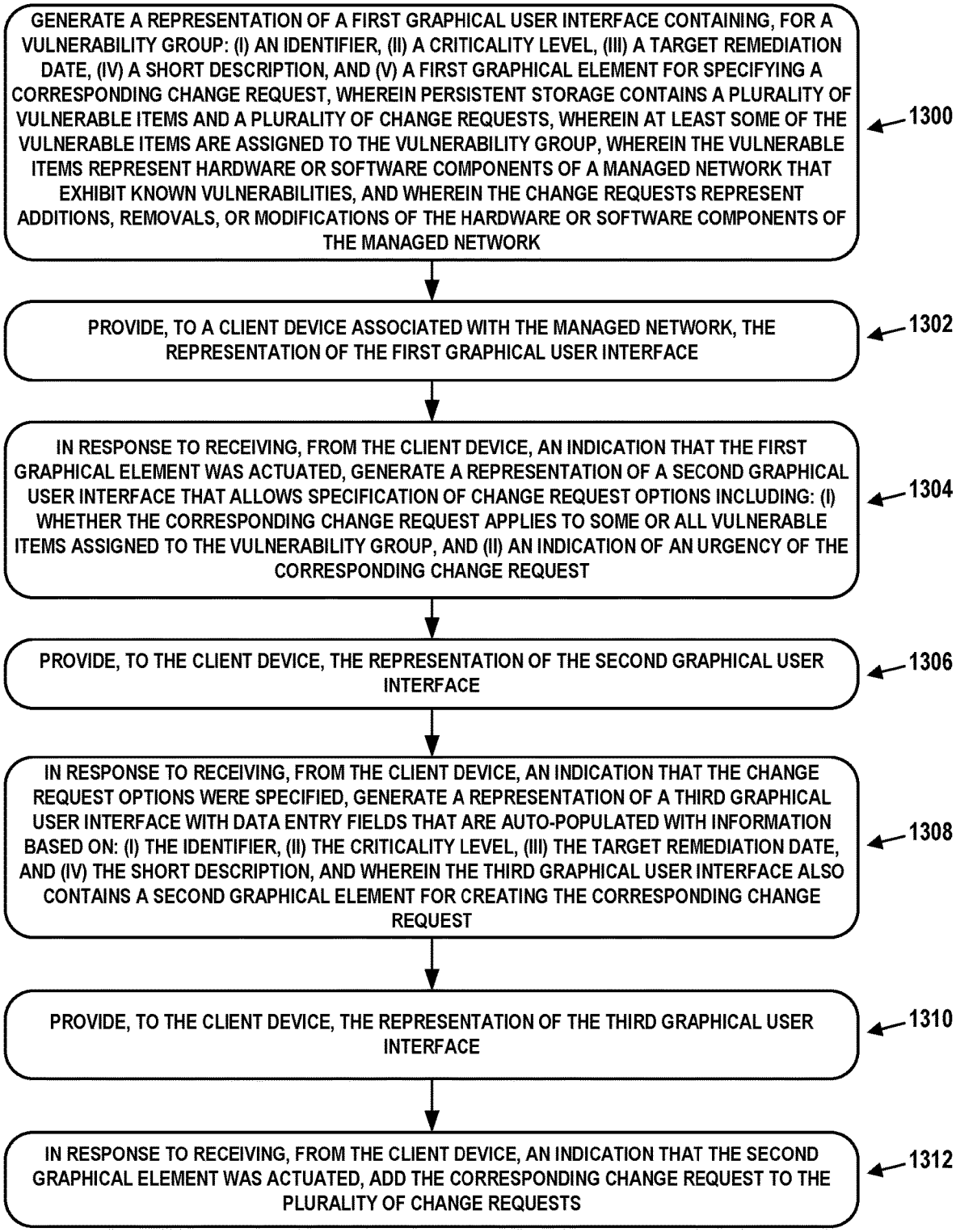
FIG. 13 is a flow chart, in accordance with example embodiments.

FIG. 13 is a flow chart illustrating an example embodiment. The process illustrated by FIG. 13 may be carried out by a computing device, such as computing device 100, and/or a cluster of computing devices, such as server cluster 200. However, the process can be carried out by other types of devices or device subsystems, such as a computational instance of a remote network management platform. For example, the process could be carried out by a portable computer, such as a laptop or a tablet device.

The embodiments of FIG. 13 may be simplified by the removal of any one or more of the features shown therein. Further, these embodiments may be combined with features, aspects, and/or implementations of any of the previous figures or otherwise described herein.

Block 1300 may involve generating a representation of a first graphical user interface containing, for a vulnerability group: (i) an identifier, (ii) a criticality level, (iii) a target remediation time, (iv) a short description, and (v) a first graphical element for specifying a corresponding change request, wherein persistent storage contains a plurality of vulnerable items and a plurality of change requests, wherein at least some of the vulnerable items are assigned to the vulnerability group, wherein the vulnerable items represent hardware or software components of a managed network that exhibit known vulnerabilities, and wherein the change requests represent additions, removals, or modifications of the hardware or software components of the managed network.

Block 1302 may involve providing, to a client device associated with the managed network, the representation of the first graphical user interface.

Block 1304 may involve, possibly in response to receiving, from the client device, an indication that the first graphical element was actuated, generating a representation of a second graphical user interface that allows specification of change request options including: (i) whether the corresponding change request applies to some or all vulnerable items assigned to the vulnerability group, and (ii) an indication of an urgency of the corresponding change request.

Block 1306 may involve providing, to the client device, the representation of the second graphical user interface.

Block 1308 may involve, possibly in response to receiving, from the client device, an indication that the change request options were specified, generating a representation of a third graphical user interface with data entry fields that are auto-populated with information based on: (i) the identifier, (ii) the criticality level, (iii) the target remediation time, and (iv) the short description, and wherein the third graphical user interface also contains a second graphical element for creating the corresponding change request.

Block 1310 may involve providing, to the client device, the representation of the third graphical user interface.

Block 1312 may involve, possibly in response to receiving, from the client device, an indication that the second graphical element was actuated, adding the corresponding change request to the plurality of change requests.

In some embodiments, the criticality level as appearing in the third graphical user interface is a highest criticality level of all vulnerable items in the vulnerability group, wherein the target remediation time appearing in the third graphical user interface is an earliest target remediation time of all vulnerable items in the vulnerability group.

In some embodiments, the data entry fields of the third graphical user interface are also auto-populated with further information based on a number of the known vulnerabilities of the vulnerable items in the vulnerability group, and a number of the hardware or software components of the managed network impacted by the known vulnerabilities of the vulnerable items in the vulnerability group.

In some embodiments, the data entry fields of the third graphical user interface are also auto-populated with further information based on a software patch that, when applied, addresses at least some of the known vulnerabilities of the vulnerable items in the vulnerability group.

In some embodiments, the indication of the urgency of the corresponding change request is either standard, emergency, or normal, wherein a standard change request relates to pre-approved changes based on software patch cycles of a third party, wherein an emergency change request relates to changes that should be applied expeditiously, and wherein a normal change request relates to changes that are neither standard nor emergency.

In some embodiments, the change request options specify that the corresponding change request applies to some of the vulnerable items assigned to the vulnerability group. These embodiments may further involve: (i) modifying the second graphical user interface to include filter options that allow specification of a filter expression that defines a subset of the vulnerable items assigned to the vulnerability group; (ii) modifying the second graphical user interface to include a preview option to preview the subset of the vulnerable items; and (iii) also in response to receiving, from the client device, the indication that the change request options were specified, creating a new vulnerability group and moving the subset of the vulnerable items to the new vulnerability group, wherein the corresponding change request is applicable to the new vulnerability group, and wherein the data entry fields of the third graphical user interface are auto-populated with information based on the subset of the vulnerable items.

In some embodiments, the representation of the first graphical user interface also contains a third graphical element for associating one or more of the change requests to the vulnerability group. These embodiments may further involve, possibly in response to receiving, from the client device, an indication that the third graphical element was actuated, generating representations of one or more further graphical user interfaces that include options that allow: searching of the plurality of change requests, specification of the one or more change requests to be associated with the vulnerability group, and adding the one or more change requests to the vulnerability group.

In some embodiments, the first graphical user interface also contains a third graphical element for splitting the vulnerability group. These embodiments may further involve, possibly in response to receiving, from the client device, the indication that the third graphical element was actuated, generating representations of one or more further graphical user interfaces that include options that allow: specification of a filter expression that defines a subset of the vulnerable items assigned to the vulnerability group, selection of a preview indicating the subset of the vulnerable items, creation of a new vulnerability group, and splitting of the vulnerability group so that the subset of the vulnerable items are moved to the new vulnerability group.

In some embodiments, the first graphical user interface also contains an option for specification of a subset of the vulnerable items from a listing of the vulnerable items in the vulnerability group. These embodiments may further involve, possibly in response to receiving, from the client device, the specification of the subset of the vulnerable items, creating a new vulnerability group and splitting the vulnerability group so that the subset of the vulnerable items are moved to the new vulnerability group.

In some embodiments, the vulnerability group can be in one of a plurality of possible states including an awaiting implementation state indicating that a plan for addressing the known vulnerabilities of the vulnerable items in the vulnerability group has been established, wherein the vulnerability group was not in the awaiting implementation state before generating the representation of the third graphical user interface, and wherein adding the corresponding change request to the plurality of change requests causes the vulnerability group to transition to the awaiting implementation state.

In some embodiments, the vulnerability group can be in one of a plurality of possible states including a resolved state indicating that the known vulnerabilities of the vulnerable items in the vulnerability group have been resolved, wherein the vulnerability group was not in the resolved state when the corresponding change request was added to the plurality of change requests, wherein the corresponding change request can be in a second plurality of possible states including an implemented state indicating that the corresponding change request has been implemented in the managed network, and wherein transitioning the corresponding change request to the implemented state causes the vulnerability group to transition to the resolved state.

IX. CONCLUSION

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, or compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A system, comprising:
one or more hardware processors; and
a non-transitory memory storing instructions that, when executed by the one or more hardware processors, causes the one or more hardware processors to perform actions comprising:
storing an indication of a vulnerability group of a managed network, wherein the vulnerability group comprises one or more hardware or software components of the managed network, and wherein the vulnerability group identifies one or more vulnerabilities of the one or more hardware or software components;
receiving a command to split the vulnerability group into a first vulnerability group and a second vulnerability group based on a filter expression, wherein the first vulnerability group comprises a first subset of the one or more hardware or software components that match the filter expression, wherein the second vulnerability group comprises a second subset of the one or more hardware or software components that do not match filter expression;
receiving one or more inputs defining a first change request related to only the first vulnerability group and a second change request related to only the second vulnerability group;
generating the first change request and the second change request based on the received one or more inputs;
storing a first association of the first change request with the first vulnerability group; and
storing a second association of the second change request with the second vulnerability group.

2. The system of claim 1, wherein generating the first change request, the second change request, or both, comprises auto-populating one or more data fields of the first change request, the second change request, or both, with data from the vulnerability group.

3. The system of claim 2, wherein the one or more data fields comprise an identifier of the vulnerability group, a risk score of the vulnerability group, a target remediation time of the vulnerability group, or a description of the vulnerability group, or any combination thereof.

4. The system of claim 1, wherein the actions comprise:
providing a list of one or more existing change requests, wherein the first change request is different from the one or more existing change requests;
receiving a request to associate a particular existing change request of the one or more existing change requests with the first vulnerability group; and
storing an additional association of the particular existing change request with the first vulnerability group in response to receiving the request to associate the particular existing change request with the first vulnerability group.

5. The system of claim 1, wherein the actions comprise:
receiving an indication of a state transition of the first change request, wherein the state transition comprises a transition between two of a plurality of states of the first change request, and wherein the plurality of states comprise a new state, an assessed state, an authorized state, a scheduled state, an implemented state, a reviewed state, a closed state, or a canceled state, or any combination thereof; and
updating a corresponding state of the first vulnerability group in response to receiving the indication of the state transition of the first change request.

6. The system of claim 1, wherein the actions comprise:
obtaining one or more vulnerability definitions from a third-party database, wherein the one or more vulnerability definitions comprise a first severity scale for the one or more vulnerabilities of the one or more hardware or software components;
normalizing the one or more vulnerability definitions to generate one or more normalized definitions, wherein the one or more normalized definitions comprise a second severity scale for the one or more vulnerabilities that is different from the first severity scale;
obtaining vulnerability data from a third-party vulnerability tool, wherein the vulnerability data comprises a first severity rating ranked on the first severity scale for each vulnerability of the one or more vulnerabilities;
determining a second severity rating ranked on the second severity scale for each vulnerability of the one or more vulnerabilities based on the one or more normalized definitions;
determining an importance of each component of the one or more hardware or software components; and
generating a risk score for each component of the one or more hardware or software components of the managed network based on the second severity rating for each vulnerability of the one or more vulnerabilities and the importance of each component.

7. The system of claim 6, wherein the actions comprise automatically associating the risk score for each component of the one or more hardware or software components of the managed network with the first change request and the second change request.

8. The system of claim 1, wherein the filter expression comprises one or more fields that define one or more conditions of the one or more hardware or software components.

9. The system of claim 1, wherein the actions comprise providing a representation of a graphical user interface (GUI) configured to:
display a representation of the vulnerability group; and
receive the filter expression, wherein the filter expression defines one or more conditions for splitting the vulnerability group.

10. A method, comprising:
storing an indication of a vulnerability group of a managed network, wherein the vulnerability group comprises one or more hardware or software components of the managed network, and wherein the vulnerability group identifies one or more vulnerabilities of the one or more hardware or software components;
receiving a command to split the vulnerability group into a first vulnerability group and a second vulnerability group based on a filter expression, wherein the first vulnerability group comprises a first subset of the one or more hardware or software components that match the filter expression, wherein the second vulnerability group comprises a second subset of the one or more hardware or software components that do not match filter expression;
receiving one or more inputs defining a first change request related to only the first vulnerability group and a second change request related to only the second vulnerability group;
generating the first change request and the second change request based on the received one or more inputs;

storing a first association of the first change request with the first vulnerability group; and storing a second association of the second change request with the second vulnerability group.

11. The method of claim 10, wherein generating the first change request, the second change request, or both, comprises auto-populating one or more data fields of the first change request, the second change request, or both, with data from the vulnerability group.

12. The method of claim 10, comprising:

providing a list of one or more existing change requests, wherein the first change request is different from the one or more existing change requests;

receiving a request to associate a particular existing change request of the one or more existing change requests with the first vulnerability group; and storing an additional association of the particular existing change request with the first vulnerability group in response to receiving the request to associate the particular existing change request with the first vulnerability group.

13. The method of claim 10, comprising:

receiving an indication of a state transition of the first change request, wherein the state transition comprises a transition between two of a plurality of states of the first change request, and wherein the plurality of states comprise a new state, an assessed state, an authorized state, a scheduled state, an implemented state, a reviewed state, a closed state, or a canceled state, or any combination thereof, and updating a corresponding state of the first vulnerability group in response to receiving the indication of the state transition of the first change request.

14. A non-transitory computer-readable medium comprising computer readable code, that when executed by one or more processors, causes the one or more processors to perform operations comprising:

storing an indication of a vulnerability group of a managed network, wherein the vulnerability group comprises one or more hardware or software components of the managed network, and wherein the vulnerability group identifies one or more vulnerabilities of the one or more hardware or software components;

receiving a command to split the vulnerability group into a first vulnerability group and a second vulnerability group based on a filter expression, wherein the first vulnerability group comprises a first subset of the one or more hardware or software components that match the filter expression, wherein the second vulnerability group comprises a second subset of the one or more hardware or software components that do not match filter expression;

receiving one or more inputs defining a first change request related to only the first vulnerability group and a second change request related to only the second vulnerability group;

generating the first change request and the second change request based on the received one or more inputs;

storing a first association of the first change request with the first vulnerability group; and storing a second association of the second change request with the second vulnerability group.

15. The non-transitory computer-readable medium of claim 14, wherein generating the first change request, the second change request, or both, comprises auto-populating one or more data fields of the first change request, the second change request, or both, with data from the vulnerability group.

16. The non-transitory computer-readable medium of claim 14, wherein the operations comprise:

providing a list of one or more existing change requests, wherein the first change request is different from the one or more existing change requests;

receiving a request to associate a particular existing change request of the one or more existing change requests with the first vulnerability group; and storing an additional association of the particular existing change request with the first vulnerability group in response to receiving the request to associate the particular existing change request with the first vulnerability group.

* * * * *